United States Patent
Spalt et al.

(10) Patent No.: US 11,575,263 B2
(45) Date of Patent: Feb. 7, 2023

(54) OPTIMAL POWER FLOW CONTROL VIA DYNAMIC POWER FLOW MODELING

(71) Applicant: Utilidata, Inc., Providence, RI (US)

(72) Inventors: Taylor Spalt, Providence, RI (US); Ning Li, Mansfield, MA (US); Marissa Hummon, Golden, CO (US); Brandon Thayer, Richland, WA (US)

(73) Assignee: Utilidata, Inc., Providence, RI (US)

( * ) Notice: Subject to any disclaimer, the term of this patent is extended or adjusted under 35 U.S.C. 154(b) by 0 days.

(21) Appl. No.: 17/200,367

(22) Filed: Mar. 12, 2021

(65) Prior Publication Data

US 2022/0294217 A1    Sep. 15, 2022

(51) Int. Cl.
| | |
|---|---|
| *H02J 3/00* | (2006.01) |
| *G06Q 50/06* | (2012.01) |
| *G06K 9/62* | (2022.01) |
| *G06N 20/00* | (2019.01) |
| *G06Q 10/04* | (2012.01) |

(52) U.S. Cl.
CPC ............ *H02J 3/003* (2020.01); *G06K 9/6256* (2013.01); *G06N 20/00* (2019.01); *G06Q 10/04* (2013.01); *G06Q 50/06* (2013.01); *H02J 3/004* (2020.01)

(58) Field of Classification Search
None
See application file for complete search history.

(56) References Cited

U.S. PATENT DOCUMENTS

| | | | |
|---|---|---|---|
| 5,970,103 A | 10/1999 | Townshend | |
| 7,179,270 B2 | 2/2007 | Makower | |
| 8,437,883 B2 | 5/2013 | Powell et al. | |
| 8,577,510 B2 | 11/2013 | Powell et al. | |
| 11,334,036 B2 * | 5/2022 | Yang | .................... G05B 13/027 |
| 2002/0110280 A1 | 8/2002 | Prakash et al. | |

(Continued)

FOREIGN PATENT DOCUMENTS

| | | |
|---|---|---|
| JP | 2019-091124 A | 6/2019 |
| WO | WO-2020/160427 A1 | 8/2020 |

OTHER PUBLICATIONS

Foucquier et al., "State of the art in building modelling and energy performances prediction: A review," Elsevier, 2013, 17pg. (Year: 2013).*

(Continued)

*Primary Examiner* — Ryan D. Coyer
(74) *Attorney, Agent, or Firm* — Foley & Lardner LLP

(57) ABSTRACT

Systems and methods are directed to controlling components of a utility grid. The system can receive data samples including signals detected at one or more portions of a utility grid. The system can construct a matrix having a first dimension and a second dimension. The system can train a machine learning model based on the matrix to predict values for signals of the utility grid not provided in the matrix. The system can receive bounds for one or more input variables, constraints on one or more output variables, and a performance objective for the utility grid. The system can determine, based on the machine learning model and via an optimization technique, an adjustment to a component of the utility grid that satisfies the performance objective. The system can provide the adjustment to the component of the utility grid to satisfy the performance objective.

20 Claims, 6 Drawing Sheets

(56) References Cited

U.S. PATENT DOCUMENTS

| | | | |
|---|---|---|---|
| 2008/0243067 A1 | 10/2008 | Rottenberg et al. | |
| 2008/0249397 A1 | 10/2008 | Kapadia | |
| 2009/0088685 A1 | 4/2009 | Kugler et al. | |
| 2009/0124899 A1 | 5/2009 | Jacobs et al. | |
| 2010/0063534 A1 | 3/2010 | Kugler et al. | |
| 2012/0296482 A1 | 11/2012 | Steven et al. | |
| 2012/0316697 A1 | 12/2012 | Boardman et al. | |
| 2013/0166084 A1 | 6/2013 | Sedighy et al. | |
| 2013/0232094 A1* | 9/2013 | Anderson | G05B 23/0281 706/12 |
| 2013/0289772 A1 | 10/2013 | Friedrich et al. | |
| 2014/0265574 A1 | 9/2014 | Tyler et al. | |
| 2014/0277796 A1 | 9/2014 | Peskin et al. | |
| 2014/0277813 A1 | 9/2014 | Powell et al. | |
| 2014/0277814 A1 | 9/2014 | Hall et al. | |
| 2014/0312693 A2 | 10/2014 | Powell et al. | |
| 2015/0100172 A1 | 4/2015 | Forbes, Jr. | |
| 2015/0248510 A1* | 9/2015 | Meagher | G06F 30/20 703/18 |
| 2016/0343093 A1 | 11/2016 | Riland et al. | |
| 2018/0100911 A1 | 4/2018 | Bell | |
| 2019/0324411 A1 | 10/2019 | Vanhoudt et al. | |
| 2020/0073342 A1 | 3/2020 | Lee et al. | |
| 2020/0136392 A1* | 4/2020 | Murugesan | H02J 3/383 |
| 2020/0409323 A1 | 12/2020 | Spalt et al. | |

OTHER PUBLICATIONS

Li et al., "Residential Household Non-lntrusive Load Monitoring via Graph-Based Multi-Label Semi-Supervised Learning," IEEE, 2019, 13pg. (Year: 2019).*

Raza et al., "Application of signal processing techniques for islanding detection of distributed generation in distribution network: A review," Elsevier, 2015, 12pg. (Year: 2015).*

Zor et al., "A State-of-the-Art Review of Artificial Intelligence Techniques for Short-Term Electric Load Forecasting," IEEE, 2017, 7pg. (Year: 2017).*

ABB Network Manager EMS (https://www.hitachiabb-powergrids.com/offering/product-and-system/scada/network-management/abb-ability-network-manager-ems).

Bernstein, A., & Dall'Anese, E. (2019). Real-time feedback-based optimization of distribution grids: A unified approach. IEEE Transactions on Control of Network Systems, 6(3), 1197-1209.

Chen, Y., Shi, Y., & Zhang, B. (2020). Data-Driven Optimal Voltage Regulation Using Input Convex Neural Networks. Electric Power Systems Research, 189, 106741.

CYME Optimal Power Flow (http://www.cyme.com/software/cymopf/).

ETAP (https://etap.com/product/optimal-power-flow-software).

Fioretto, F., Mak, T. W., & Van Hentenryck, P. (Apr. 2020l). Predicting AC optimal power flows: Combining deep learning and lagrangian dual methods. In Proceedings of the AAAI Conference on Artificial Intelligence (vol. 34, No. 01, pp. 630-637).

Hsu, Y. Y., & Lu, F. C. (1998). A combined artificial neural network-fuzzy dynamic programming approach to reactive power/voltage control in a distribution substation. IEEE Transactions on Power Systems, 13(4), 1265-1271.

International Search Report and Written Opinion on PCT PCT/US2020/039873 dated Sep. 17, 2020.

Isaacson, Jerry, Ph.D. et al., "Ignyta, Inc.: Initiation of Coverage," LifeSci Advisors Research, Feb. 14, 2014, pp. 1-37.

J. Cardona, T. Gill, and S. Powell, "CS229: Machine Learning Models for Inverse Power Flow in the Grid". CS229 Final Report (2017).

Pourjafari, E., & Reformat, M. (2019). A Support Vector Regression Based Model Predictive Control for Volt-Var Optimization of Distribution Systems. IEEE Access, 7, 93352-93363.

R. Sevlian et al., "Vader: Visualization and analytics for distributed energy resources". arXiv preprint arXiv:1708.09473 (2017).

Singh, M. K., Gupta, S., Kekatos, V., Cavraro, G., & Bernstein, A. (2020). Learning to Optimize Power Distribution Grids using Sensitivity-Informed Deep Neural Networks. arXiv preprint arXiv:2007.03728.

U.S. Office Action on U.S. Appl. No. 16/526,465 dated Jan. 8, 2021.

Zamzam, A., & Baker, K. (2019). Learning optimal solutions for extremely fast ac optimal power flow. arXiv preprint arXiv:1910.01213.

Australian Examination Report on AU Appln. 2020308011 dated Apr. 20, 2022.

European Extended Search Report on EP Appln 22161138.7 dated Aug. 4, 2022.

International Preliminary Report on Patentability on PCT Appln. PCT/US2020/039873 dated Jan. 6, 2022.

Japanese Examination Report on JP appln. 2021-566941 dated Jun. 21, 2022.

Notice of Allowance on U.S. Appl. No. 16/526,465 dated Apr. 15, 2021.

Examination Report regarding AU 202030801 dated Oct. 10, 2022.

* cited by examiner

OPTIMAL POWER FLOW CONTROL VIA DYNAMIC POWER FLOW MODELING

FIELD OF THE DISCLOSURE

This disclosure relates generally to systems and methods for predictively controlling a utility grid using a dynamic power flow model and linear optimization. In particular, the systems and methods of this disclosure can predict circuit states under varied changes in control variables and control components on a utility grid based on a data-driven, real-time, dynamic power flow model.

BACKGROUND

Utility distribution grids can use meters to observe or measure utility delivery or consumption in the grid. The utility distribution grid can include numerous connection points and components. However, it may be challenging to evaluate characteristics of utility supply or consumption in order to maintain efficient and reliable utility distribution throughout the utility grid.

BRIEF SUMMARY OF THE DISCLOSURE

Systems and methods of this disclosure are directed to controlling a utility grid using a dynamic power flow model. The systems and methods of this disclosure can control components on a utility grid based on a data-driven, real-time, dynamic power flow model. For example, a system can receive data samples including signals from components of the utility grid, clean, and filter the signals. The system can use a machine learning model and an optimization technique to predict a value for the utility grid based on the input signals. The machine learning model can be based on a linear model and the optimization technique can include linear programming or a linear optimization technique to increase efficiency for calculating the value. The linear optimization technique can be hyper-parameter-free. Subsequently, the system can control, manage, or otherwise maintain the utility grid based on the input signals and the value determined by the machine learning model via linear optimization.

At least one aspect of this technical solution is directed to a method of controlling components of a utility grid. The method can include a data processing system receiving a plurality of data samples comprising signals detected by one or more devices located at one or more portions of a utility grid. The method can include the data processing system constructing a matrix having a first dimension corresponding to timestamps of the plurality of data samples, and a second dimension corresponding to the signals and one or more statistical metrics generated based on the signals. The method can include the data processing system training a machine learning model based on the matrix to configure the machine learning model to predict an output matrix comprising values for signals of the utility grid not provided in the matrix. The method can include the data processing system receiving bounds for one or more input variables to the machine learning model, constraints on one or more output variables of the machine learning model, and a performance objective for the utility grid. The method can include the data processing system determining, based on the machine learning model and via an optimization technique applied to the bounds for the one or more input variables and the constraints on the one or more output variables, an adjustment to a component of the utility grid that satisfies the performance objective. The method can include the data processing system providing the adjustment to the component of the utility grid to cause the utility grid to satisfy the performance objective.

The method can include the data processing system training, absent a model of a physical network of the utility grid, the machine learning model with data samples received from automated metering infrastructure of the utility grid. The method can include the data processing system training the machine learning model based on the matrix to configure the machine learning model to predict the output matrix comprising values for signals of the utility grid at a time for which the values for the signals are not provided in the matrix.

The method can include the data processing system receiving the plurality of data samples comprising signals corresponding to voltage, active power, and reactive power detected by automated metering infrastructure, a tap position of a voltage regulator, a switch state of a capacitor bank, and weather data associated with a plurality of locations on the utility grid. The method can include the data processing system inputting the plurality of data samples into the machine learning model to predict an active power and reactive power at a substation and voltage values at a plurality of locations on the utility grid. The method can include the data processing system determining the adjustment to the component based on the predicted active power and the predicted reactive power at the substation and the predicted voltage values at the plurality of locations on the utility grid.

The method can include the data processing system transmitting a command to the component that adjusts a value for at least one of the one or more output variables within the constraints on the one or more output variables and satisfies the performance objective. The method can include the data processing system receiving, from an autonomous device connected to the utility grid, one or more values for one or more signals subsequent to the adjustment of the component of the utility grid, the autonomous device not directly controlled by the data processing system. The method can include the data processing system determining a second adjustment to the component of the utility grid based on the one or more values for the one or more signals received subsequent to the adjustment to the component, the machine learning model, and the optimization technique The constraints on the one or more output variables can include a predetermined range of voltages for a customer device connected to the utility grid. The performance objective can include at least one of a level of substation demand, reduction in energy usage below a threshold, maintenance of stability during intermittent renewable generation, adjustment of a power factor range set by the utility grid, or increased capacity of distributed energy resources above a second threshold. The machine learning engine can include a three-phase unbalanced power flow model. The optimization technique can include one of a brute-force optimization technique, simulated annealing optimization technique, particle swarm optimization technique, genetic optimization technique, convex optimization technique, linear optimization technique, or a non-linear optimization technique. The machine learning model can be based on a linear model, and the optimization technique comprises a linear optimization technique. The components can include at least one of a voltage regulator, capacitor bank, switch, or inverter.

At least one aspect of this technical solution is directed to a system to control components of a utility grid. The system can include a data processing system. The data processing system can include a memory and one or more processors. The data processing system can receive a plurality of data samples comprising signals detected by one or more devices located at one or more portions of a utility grid. The data processing system can construct a matrix having a first dimension corresponding to timestamps of the plurality of data samples, and a second dimension corresponding to the signals and one or more statistical metrics generated based on the signals. The data processing system can train a machine learning model based on the matrix to configure the machine learning model to predict an output matrix comprising values for signals of the utility grid not provided in the matrix. The data processing system can receive bounds for one or more input variables to the machine learning model, constraints on one or more output variables of the machine learning model, and a performance objective for the utility grid. The data processing system can determine, based on the machine learning model and via an optimization technique applied to the bounds for the one or more input variables and the constraints on the one or more output variables, an adjustment to a component of the utility grid that satisfies the performance objective. The data processing system can provide the adjustment to the component of the utility grid to cause the utility grid to satisfy the performance objective.

The data processing system can train, absent a model of a physical network of the utility grid, the machine learning model with data samples received from automated metering infrastructure of the utility grid. The data processing system can train the machine learning model based on the matrix to configure the machine learning model to predict the output matrix comprising values for signals of the utility grid at a time for which the values for the signals are not provided in the matrix.

The data processing system can receive the plurality of data samples comprising signals corresponding to voltage, active power, and reactive power detected by automated metering infrastructure, a tap position of a voltage regulator, a switch state of a capacitor bank, and weather data associated with a plurality of locations on the utility grid. The data processing system can input the plurality of data samples into the machine learning model to predict an active power and reactive power at a substation and voltage values at a plurality of locations on the utility grid. The data processing system can determine the adjustment to the component based on the predicted active power and the predicted reactive power at the substation and the predicted voltage values at the plurality of locations on the utility grid.

The data processing system can transmit a command to the component that adjusts a value for at least one of the one or more output variables within the constraints on the one or more output variables and satisfies the performance objective. The data processing system can receive, from an autonomous device connected to the utility grid, one or more values for one or more signals subsequent to the adjustment of the component of the utility grid, the autonomous device not directly controlled by the data processing system. The data processing system can determine a second adjustment to the component of the utility grid based on the one or more values for the one or more signals received subsequent to the adjustment to the component, the machine learning model, and the optimization technique.

The constraints on the one or more output variables can include a predetermined range of voltages for a customer device connected to the utility grid. The performance objective can include at least one of a level of substation demand, reduction in energy usage below a threshold, maintenance of stability during intermittent renewable generation, adjustment of a power factor range set by the utility grid, or increased capacity of distributed energy resources above a second threshold. The machine learning engine can include a three-phase unbalanced power flow model. The optimization technique can include one of a brute-force optimization technique, simulated annealing optimization technique, particle swarm optimization technique, genetic optimization technique, convex optimization technique, linear optimization technique, or a non-linear optimization technique. The machine learning model can be based on a linear model, and the optimization technique comprises a linear optimization technique. The components can include at least one of a voltage regulator, capacitor bank, switch, or inverter.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE FIGURES

The accompanying drawings are not intended to be drawn to scale. Like reference numbers and designations in the various drawings indicate like elements having similar structure or functionality. For purposes of clarity, not every component may be labeled in every drawing. In the drawings.

Figure 1:
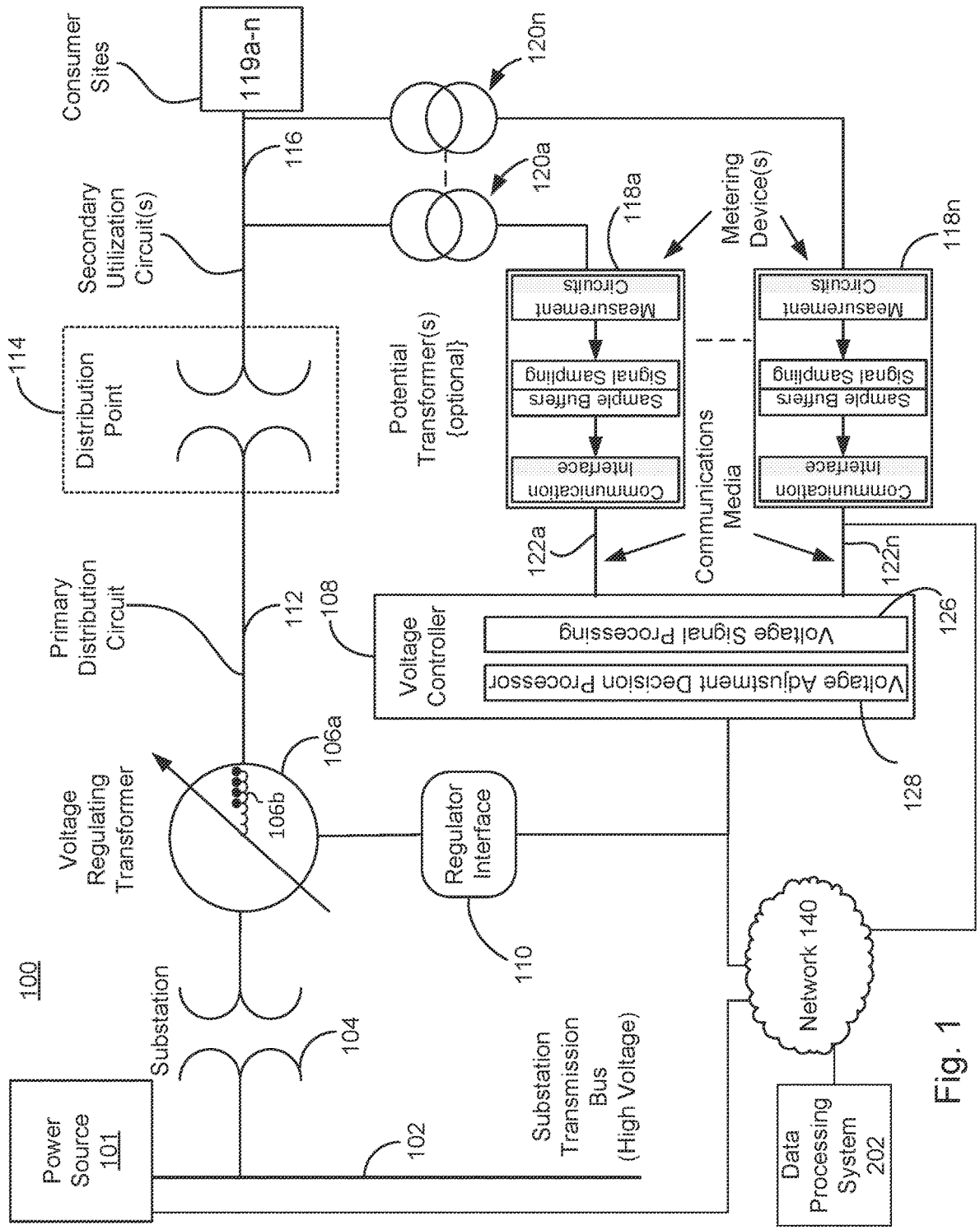
FIG. 1 is a block diagram depicting an illustrative utility grid, in accordance with an implementation.

The features and advantages of the present solution will become more apparent from the detailed description set forth below when taken in conjunction with the drawings, in which like reference characters identify corresponding elements throughout. Other features, aspects, and advantages of the subject matter will become apparent from the description, the drawings, and the claims.

DETAILED DESCRIPTION

Following below are more detailed descriptions of various concepts related to, and implementations of, methods, apparatuses, and systems of controlling components in a utility grid. The various concepts introduced above and discussed in greater detail below may be implemented in any of numerous ways.

A utility grid, or utility distribution system, can distribute electricity. A system that manages the utility grid can use power flow modeling to predict, identify, or otherwise determine the real power, reactive power, and voltage effects of changes to the system. Using the power flow model can allow for improved or optimal device settings, operational control, and planning of future system resource consumption.

However, generating, constructing, or building a power flow model can be challenging because they are built on deriving the resistance and reactance values from the physical properties of overhead and underground conductors, transformers, capacitors, reactors, generators, and loads of the utility grid circuit being modeled. When building a power flow model, certain assumptions, such as eliminating the magnetization branch in transformer modeling or removing resistive components from certain elements, may be made during the modeling in order to reduce the complexity of the processing. However, reducing the complexity of processing in this manner can result in less accurate or unreliable determinations of values or characteristics of electricity associated with the utility grid.

The systems and methods of this technical solution provide utility grid control using a data-driven, real-time, dynamic power flow model. For example, the technology disclosed herein can construct the power flow model by feeding recorded data from different physical locations/devices on the utility grid circuit into a machine learning generator which learns the characteristics of the utility grid circuit through training itself on the input data. By using a machine learning generator, the systems and methods of this technical solution can provide fast formation of the desired three-phase unbalanced power flow model using limited information about the system being modeled. The system can execute multiple steady-state load flow determinations at user-defined time steps to form a dynamic, real-time, time series prediction of the variables measured in the system being modeled. Examples of this load flow would be the prediction of a voltage or power time series at a secondary circuit measurement point given upstream load and voltage conditions, or the change in reactive power at downstream locations when a capacitor bank is switched. The time steps at which these predictions are made are limited by the sampling resolution of the data at the given location being predicted, such as sub-second time steps for very high-resolution devices, to hourly time steps for lower resolution data. These models can be updated whenever new input data is available, which can produce a dynamically accurate prediction during state changes in the circuit, such as when voltage optimization is turned on/off or when a portion of load is switched from one feeder to another. The forecasting range of these predictions is from the present to years ahead in time.

The systems and methods of this technical solution can use the predictive capabilities provided by the data-driven models to control circuit devices to achieve optimal power flow ("OPF") on the circuit. For example, the models can predict configurations or settings for circuit devices of the utility grid. The circuit devices can include at least a voltage regulator, a capacitor bank, a switch, an inverter, among others. The OPF can be defined by user objectives and constraints for measured quantities. The objectives can, for example, include minimizing operation cost, maintaining a predetermined operating level for power generation or level of substation demand (e.g., 10% beyond expected demand), reduction in energy usage below a threshold, maintenance of stability during intermittent renewable generation, adjustment of a power factor range set by the utility grid, or increased capacity of distributed energy resources above a second threshold. At least one of the aforementioned models can enable the prediction of circuit states under varied changes in control variables including bounds for input variables or constraints for output variables. The terms constraints and bounds can be used interchangeably in this case. Thus, the technology disclosed herein can estimate a control state which optimally achieves user-defined objectives/constraints (e.g., lowest substation demand while maintaining customer voltages within ANSI limits).

The distribution grid can behave linearly. For an efficient, hyper-parameter-free method for determining the optimal state, the system can utilize linear programming (e.g., "LP" or linear optimization technique) for the distribution grid with a linear behavior. The system can use a data-derived circuit model, such as a virtual power flow ("VPF") model, to enable OPF using the LP. The system can transform the VPF model into a form useable by the LP. The system can provide a closed-loop formulation for OPF to allow autonomous devices to form part of the optimized solution. For example, the system can receive feedback from actions received or recorded by the devices. These actions from the devices can assist in maintaining the stability of the OPF. The system can provide the feedback information from the devices to the data-driven model. The model can incorporate and learn from the feedback information to improve decision-making and prediction capabilities. The model can process the feedback information on a fast timescale to determine a subsequent adjustment to one or more components of the utility grid. The system can satisfy the performance objective and any constraints either statically set or dynamically determined.

The system may not require a physical model or physical-based model of the physical network of the utility grid, thereby reducing resources and time to generate and train a network model. The system can include a data-driven VPF model which can be periodically updated upon receipt of new data samples. For example, the system can receive output (e.g., adjustment to components of the utility grid) from the VPF model. The system can adjust the components and receive feedback from the utility grid after the adjustment. The system can input the feedback as a new data sample to the VPF model, thereby keeping the model up-to-date and enable the model to learn from the changes to the utility grid network in real-time. The model can retrain using recent data samples without receiving instructions indicating that the system has changed. The system can leverage measurements from automated metering infrastructure (AMI) in training the model. By leveraging the AMI, the system can include data-driven load models for power flow optimization.

The system can select the VPF model mathematical formulation to optimize power flow. For example, the system can receive instructions from an operator to select the VPF model. By pre-selecting the model, the model can be used in an LP solver. The system can avoid non-convex optimization problems in which solution-determination is computationally intensive and not guaranteed to be globally optimal. Accordingly, the system can decrease errors in solutions arising from linearizing physics-based equations.

Thus, the systems and methods of the technical solution can provide Volt/VAR optimization and voltage management; system-state prediction, optimization, and controls under various distributed energy resource scenarios (e.g., photovoltaic power generation, wind power generation, or electric vehicle penetration); fault, location, isolation, and system restoration; anti-islanding detection; or verification of the sequence and control of automatic switching, voltage control, and protection system operations.

To do so, a data processing system of this technical solution can receive and identify data samples including input data from different locations or devices on a utility grid (or utility distribution grid), such as an electricity distribution system. The input data, which can include or be referred to as signals, can be digitally recorded and transmitted by the devices on the utility grid, or other devices or servers remote from the utility grid. The signals can include raw measurements or detections made by sensors of the devices on the utility grid, or a device on the utility grid can pre-process the raw measurement or otherwise manipulate the data prior to transmitting the signal to the data processing system. Pre-processing the data locally by a device on the utility grid prior to transmission can facilitate higher prediction accuracy, or reduce network bandwidth utilization. For example, the data can be pre-processed to remove invalid samples or compress the signal data in manner that reduces network bandwidth utilization and removes erroneous data.

The data processing system can receive various types of signals. The types of signals can correspond to different locations on the utility grid. For example, a first type of signal can correspond to location generic signals, a second type of signal can correspond to a substation location on the utility grid, a third type of signal can correspond to a primary circuit on the utility grid, and a fourth type of signal can correspond to a secondary circuit on the utility grid.

These signals can be sampled in time at a rate that is equal to or greater than a predetermined or desired sampling resolution. For example, the sampling resolution in time of the signals can be greater than 1 sample every 60 seconds, such that the physical transfer functions of the circuit can be captured. If the resolution of the signals varies from one signal to another, the data processing system can synchronize the signals in time. The data processing system can identify erroneous samples and remove or modify them to clean the data to facilitate the production of accurate prediction results with the machine learning generator.

The data processing system can pre-process the received data or signals in order to increase the accuracy of the machine learning generator. For example, the data processing system can apply one or more filters to the data based on the sampling rate and other characteristics of the data. The data processing system can determine various statistical metrics from the data over time periods which define physical manifestations of system or exogenous behavior. For example, the data processing system can determine statistics such as a mean, median, minimum, maximum, standard deviation, mean difference, median difference, minimum difference, maximum difference, and standard deviation in difference.

The data processing system can construct or generate an input matrix using the received data (e.g., cleaned and pre-processed) and the determined metrics. For example, the input matrix can include rows corresponding to timestamps of the data samples and columns corresponding to the various signals and statistical metrics generated based on the signals. The rows or columns can be referred to as dimensions, such as a first dimension for rows and a second dimension for columns. The dimensions can be interchangeable depending on the methods of processing the matrix. The data processing system can weight timestamps (rows) within this training period in order to increase or decrease their importance when forming the model. The data processing system can separate the matrix into input and output variables (columns), which will be used as the inputs to the machine learning algorithm whose outputs predict the chosen output variables.

The data processing system can train a machine learning model based on the input matrix. For example, the data processing system can train the machine learning using timestamps of the data samples (e.g., the first dimension of the matrix) and signals and one or more statistical metrics generated based on the signals (e.g., the second dimension of the matrix). The first dimension and the second dimension can be referred to as a training data set for configuring the machine learning model to generate an output, such as output values for controlling components within the utility grid.

The data processing system, using the input matrix and machine learning model generator, can predict a corresponding output matrix. The model can predict a new output for a future time period, or predict an output value for a variable for which data does not exist in a current time period. The model can predict an output matrix including values for signals the utility grid not provided in the matrix.

The data processing system can receive bounds for one or more input variables to the machine learning model. The bounds for one or more input variables can include, for example, a range of temperature or current weather, one or more value for the voltage regulator tab position, a range of recorded meter voltages, among other ranges or specific value for the variables used to train the machine learning model. The data processing system can receive constraints on one or more output variables of the machine learning model. The constraints on the one or more output variables can include, for example, a predetermined range of voltages or power for a customer device connected to the utility grid. The predetermined range of voltages can be based on the time, location of the customer device, or other factors that can affect the usage of the customer device. The data processing system can receive a performance objective for the utility grid. The performance objective can include, for example, a level of substation demand, reduction in energy usage below a threshold (e.g., a first threshold), maintenance of stability during intermittent renewable generation, adjustment of a power factor range set by the utility grid, or increased capacity of distributed energy resources above a threshold (e.g., a second threshold). The data processing system can receive the bounds, constraints, or performance objective from an operator or administrator. In some cases, the data processing system can dynamically configure at least one of the aforementioned settings, for example, based on feedback data from components of the utility grid, environmental conditions, or status of the components. In some other cases, for example, the data processing system can configure the bounds, constraints, or performance objective based on a set timer, predetermined conditions, or criteria. For example, the data processing system can receive instructions from an operator to dynamically adjust output constraints based on sunrise or sunset, adjust the performance objective based on the season and weather, or adjust the input bounds after receiving a threshold number of data samples.

The data processing system can determine an adjustment to a component of the utility grid to satisfy the performance objective. The adjustment can be determined based on a machine learning model or via an optimization technique applied to the bounds for the one or more input variables and the constraints on the one or more output variables. For example, the data processing system can provide the bounds and constraints on the input and output variables to the machine learning model. The machine learning model can apply an optimization technique to the bounds and constraints. The data processing system can receive an adjustment to a component of the utility from the machine learning model. The data processing system can determine the adjustment based on an output matrix from the machine learning model. The adjustment can be a value within the output matrix, such as a predicted power level adjustment associated with a timestamp within the output matrix.

The data processing system can predict how changes to a setting or parameter on the utility grid impacts an output variable. The data processing system can output the predicted configurations or settings to an operator prior to adjusting a setting or parameter on the utility grid. The data processing system can output the potential impacts the changes to the setting or parameter on the utility grid could have on the output variables. The data processing system can determine what or how to control a component on the utility grid in order to result in a desired outcome.

The data processing system can provide the adjustment to one or more components of the utility grid. The data processing system can compare the outcome from the adjustment to the performance objective or desired results. The outcome from the adjustment can be recorded or stored as a data sample for feedback into the system. The machine learning model can learn from the outcome resulting from the adjustment and provide a second adjustment to satisfy the performance objective. Upon satisfying the performance objective, the data processing system can maintain the settings of the components of the utility grid. The data processing system can increase or decrease the rate of receiving the data samples. The data processing system can apply an optimization technique to new data samples, bounds of input variables, or constraints of output variables. The optimization technique can be a linear optimization technique or linear programming.

For example, the data processing system can optimize the voltage and VAR levels on the utility grid circuit for a technical utility grid operation goal (e.g., reduced energy usage, or stability during intermittent renewable generation). The data processing system can execute a closed optimization loop used to issue commands to utility grid devices. The data processing system can receive or ingest real-time data from utility grid devices and prior commands issued to these devices. The data processing system can predict the change in the utility grid conditions for a given set of device changes. The data processing system can evaluate the changes in grid conditions against the desired outcome. The data processing system can repeat this process, iterate through this process, or otherwise use the model to identify an optimal set of changes that satisfy the desired goal. The data processing system can achieve an outcome closer to the performance objective responsive to each adjustment to the component of the utility grid.

Thus, the data processing system of this disclosure can determine and model the relationships between variables and locations on the utility grid using recorded data and apply an optimization technique to adjust components of the utility grid in view of the performance objective. For example, a few days of data may be sufficient to begin accurately modeling these relationships, as compared to multiple years. Further, the data processing system can dynamically change the model in real-time based on the electrical data received from the utility grid and used to update the model. The data processing system, using the model, can apply one or more optimization techniques to input data samples to determine changes for the components. The data processing system can, therefore, adapt to changes due to seasonality, equipment function, varying sources or loads, and exogenous factors, without obtaining these changes a priori and manually updating a static model.

The data processing system can be decentralized. For example, the systems and functionality of the data processing system can be performed in a distributed manner with each local data recording site performing processing and communicating among its neighbors. This can result in a decentralized collection of multiple models which can predict local variables using local inputs. The local models can access global information such as weather, electricity costs, and price signals used for the dispatch or conservation of local resources. The data processing system can utilize the VPF and OPF pairing in various applications including Volt/VAR optimization and voltage management, distributed energy resource control, optimal system reconfiguration under fault conditions, coordination of a distribution-level electricity market, among others.

Referring now to FIG. 1, an example utility distribution environment is shown. The utility distribution environment can include a utility grid 100. The utility grid 100 can include an electricity distribution grid with one or more devices, assets, or digital computational devices and systems, such as computing device 600. In brief overview, the utility grid 100 includes a power source 101 that can be connected via a subsystem transmission bus 102 and/or via substation transformer 104 to a voltage regulating transformer 106a. The voltage regulating transformer 106a can be controlled by voltage controller 108 with regulator interface 110. Voltage regulating transformer 106a can be optionally coupled on primary distribution circuit 112 via optional distribution transformer 114 to secondary utilization circuits 116 and to one or more electrical or electronic devices 119. Voltage regulating transformer 106a can include multiple tap outputs 106b with each tap output 106b supplying electricity with a different voltage level. The utility grid 100 can include monitoring devices 118a-118n that can be coupled through optional potential transformers 120a-120n to secondary utilization circuits 116. The monitoring or metering devices 118a-118n can detect (e.g., continuously, periodically, based on a time interval, responsive to an event or trigger) measurements and continuous voltage signals of electricity supplied to one or more electrical devices 119 connected to circuit 112 or 116 from a power source 101 coupled to bus 102. A voltage controller 108 can receive, via a communication media 122, measurements obtained by the metering devices 118a-118n, and use the measurements to make a determination regarding a voltage tap settings, and provide an indication to regulator interface 110. The regulator interface can communicate with voltage regulating transformer 106a to adjust an output tap level 106b.

Still referring to FIG. 1, and in further detail, the utility grid 100 includes a power source 101. The power source 101 can include a power plant such as an installation configured to generate electrical power for distribution. The power source 101 can include an engine or other apparatus that generates electrical power. The power source 101 can create electrical power by converting power or energy from one state to another state. In some embodiments, the power source 101 can be referred to or include a power plant, power station, generating station, powerhouse or generating plant. In some embodiments, the power source 101 can include a generator, such as a rotating machine that converts mechanical power into electrical power by creating relative motion between a magnetic field and a conductor. The power source 101 can use one or more energy source to turn the generator including, e.g., fossil fuels such as coal, oil, and natural gas, nuclear power, or cleaner renewable sources such as solar, wind, wave and hydroelectric.

In some embodiments, the utility grid 100 includes one or more substation transmission bus 102. The substation transmission bus 102 can include or refer to transmission tower, such as a structure (e.g., a steel lattice tower, concrete, wood, etc.), that supports an overhead power line used to distribute electricity from a power source 101 to a substation 104 or distribution point 114. Transmission towers 102 can be used in high-voltage AC and DC systems, and come in a wide variety of shapes and sizes. In an illustrative example, a transmission tower can range in height from 15 to 55 meters or more. Transmission towers 102 can be of various types including, e.g., suspension, terminal, tension, and transposition. In some embodiments, the utility grid 100 can include underground power lines in addition to or instead of transmission towers 102.

In some embodiments, the utility grid 100 includes a substation 104 or electrical substation 104 or substation transformer 104. A substation can be part of an electrical generation, transmission, and distribution system. In some embodiments, the substation 104 transform voltage from high to low, or the reverse, or performs any of several other functions to facilitate the distribution of electricity. In some embodiments, the utility grid 100 can include several substations 104 between the power plant 101 and the consumer electoral devices 119 with electric power flowing through them at different voltage levels.

The substations 104 can be remotely operated, supervised and controlled (e.g., via a supervisory control and data acquisition system or data processing system 202). A substation can include one or more transformers to change voltage levels between high transmission voltages and lower distribution voltages, or at the interconnection of two different transmission voltages.

The regulating transformer 106 can include: (1) a multi-tap autotransformer (single or three phase), which are used for distribution; or (2) on-load tap changer (three phase transformer), which can be integrated into a substation transformer 104 and used for both transmission and distribution. The illustrated system described herein can be implemented as either a single-phase or three-phase distribution system. The utility grid 100 can include an alternating current (AC) power distribution system and the term voltage can refer to an "RMS Voltage", in some embodiments.

The utility grid 100 can include a distribution point 114 or distribution transformer 114, which can refer to an electric power distribution system. In some embodiments, the distribution point 114 can be a final or near final stage in the delivery of electric power. For example, the distribution point 114 can carry electricity from the transmission system (which can include one or more transmission towers 102) to individual consumers 119. In some embodiments, the distribution system can include the substations 104 and connect to the transmission system to lower the transmission voltage to medium voltage ranging between 2 kV and 35 kV with the use of transformers, for example. Primary distribution lines or circuit 112 carry this medium voltage power to distribution transformers located near the customer's premises 119. Distribution transformers can further lower the voltage to the utilization voltage of appliances and can feed several customers 119 through secondary distribution lines or circuits 116 at this voltage. Commercial and residential customers 119 can be connected to the secondary distribution lines through service drops. In some embodiments, customers demanding high load can be connected directly at the primary distribution level or the sub-transmission level.

The utility grid 100 can include or couple to one or more consumer sites 119. Consumer sites 119 can include, for example, a building, house, shopping mall, factory, office building, residential building, commercial building, stadium, movie theater, etc. The consumer sites 119 can be configured to receive electricity from the distribution point 114 via a power line (above ground or underground). A consumer site 119 can be coupled to the distribution point 114 via a power line. The consumer site 119 can be further coupled to a site meter 118*a-n* or advanced metering infrastructure ("AMI"). The site meter 118*a-n* can be associated with a controllable primary circuit segment 112. The association can be stored as a pointer, link, field, data record, or other indicator in a data file in a database.

The utility grid 100 can include site meters 118*a-n* or AMI. Site meters 118*a-n* can measure, collect, and analyze energy usage, and communicate with metering devices such as electricity meters, gas meters, heat meters, and water meters, either on request or on a schedule. Site meters 118*a-n* can include hardware, software, communications, consumer energy displays and controllers, customer associated systems, Meter Data Management (MDM) software, or supplier business systems. In some embodiments, the site meters 118*a-n* can obtain samples of electricity usage in real time or based on a time interval, and convey, transmit or otherwise provide the information. In some embodiments, the information collected by the site meter can be referred to as meter observations or metering observations and can include the samples of electricity usage. In some embodiments, the site meter 118*a-n* can convey the metering observations along with additional information such as a unique identifier of the site meter 118*a-n*, unique identifier of the consumer, a time stamp, date stamp, temperature reading, humidity reading, ambient temperature reading, etc. In some embodiments, each consumer site 119 (or electronic device) can include or be coupled to a corresponding site meter or monitoring device 118*a*-118*n*.

Monitoring devices 118*a*-118*n* can be coupled through communications media 122*a*-122*n* to voltage controller 108. Voltage controller 108 can compute (e.g., discrete-time, continuously or based on a time interval or responsive to a condition/event) values for electricity that facilitates regulating or controlling electricity supplied or provided via the utility grid. For example, the voltage controller 108 can compute estimated deviant voltage levels that the supplied electricity (e.g., supplied from power source 101) will not drop below or exceed as a result of varying electrical consumption by the one or more electrical devices 119. The deviant voltage levels can be computed based on a predetermined confidence level and the detected measurements. Voltage controller 108 can include a voltage signal processing circuit 126 that receives sampled signals from metering devices 118*a*-118*n*. Metering devices 118*a*-118*n* can process and sample the voltage signals such that the sampled voltage signals are sampled as a time series (e.g., uniform time series free of spectral aliases or non-uniform time series).

Voltage signal processing circuit 126 can receive signals via communications media 122*a-n* from metering devices 118*a-n*, process the signals, and feed them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and can perform the same function. For example, in some embodiments the functionality can be carried out using one or more digital processors, e.g., implementing one or more digital signal processing algorithms. Adjustment decision processor circuit 128 can determine a voltage location with respect to a defined decision boundary and set the tap position and settings in response to the determined location. For example, the adjustment decision processing circuit 128 in voltage controller 108 can compute a deviant voltage level that is used to adjust the voltage level output of electricity supplied to the electrical device. Thus, one of the multiple tap settings of regulating transformer 106 can be continuously selected by voltage controller 108 via regulator interface 110 to supply electricity to the one or more electrical devices based on the computed deviant voltage level. The voltage controller 108 can also receive information about voltage regulator transformer 106*a* or output tap settings 106*b* via the regulator interface 110. Regulator interface 110 can include a processor controlled circuit for selecting one of the multiple tap settings in voltage regulating transformer 106 in response to an indication signal from voltage controller 108. As the computed deviant voltage level changes, other tap settings 106*b* (or settings) of regulating transformer 106*a* are selected by voltage controller 108 to change the voltage level of the electricity supplied to the one or more electrical devices 119.

The network 140 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 140 can be any type and/or form of network. The geographical scope of the network 140 can vary widely and the network 140 can be a body area network (BAN), a personal area network (PAN), a local-area network (LAN), e.g. Intranet, a metropolitan area network (MAN), a wide area network (WAN), or the Internet. The topology of the network 140 can be of any form and can include, e.g., any of the following: point-to-point, bus, star, ring, mesh, or tree. The network 140 can be an overlay network which is virtual and sits on top of one or more layers of other networks 140. The network 140 can be of any such network topology as known to those ordinarily skilled in the art capable of supporting the operations described herein. The network 140 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 140 can be a type of a broadcast network, a telecommunications network, a data communication network, or a computer network.

One or more components, assets, or devices of utility grid 100 can communicate via network 140. The utility grid 100 can use one or more networks, such as public or private networks. The utility grid 100 can communicate or interface with a data processing system 202 designed and constructed to communicate, interface or control the utility grid 100 via network 140. Each asset, device, or component of utility grid 100 can include one or more computing devices 600 or a portion of computing device 600 or some or all functionality of computing device 600.

Figure 2:
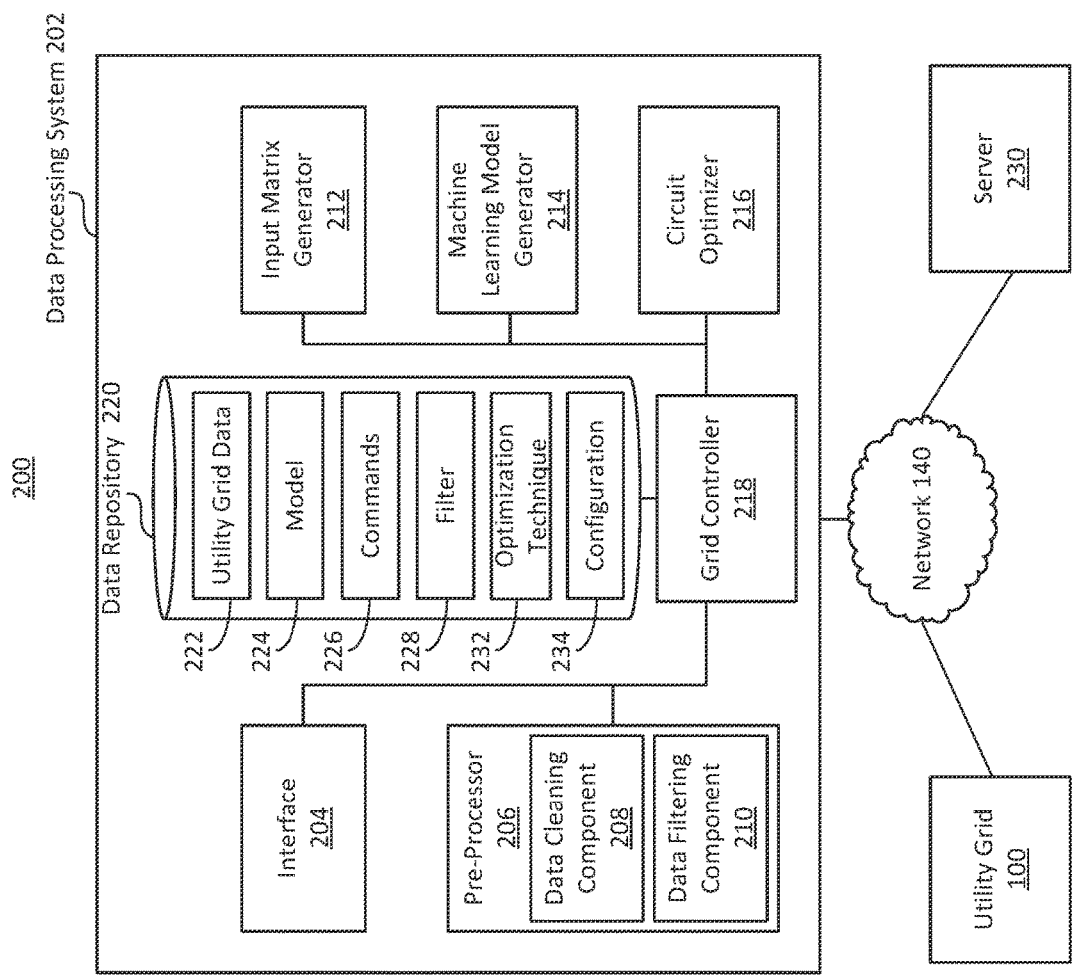
FIG. 2 is a block diagram depicting a system for controlling components in a utility grid, in accordance with an implementation.

FIG. 2 depicts a block diagram depicting an example system to control components of a utility grid. The system 200 can include at least one data processing system 202. The data processing system 202 can include at least one interface 204, at least on pre-processor 206 (or pre-processor component), at least one input matrix generator 212 (or input matrix generator component), at least one machine learning model generator 214 (or machine learning model generator component), at least one circuit optimizer 216 (or circuit optimizer component), or at least one grid controller 218 (or grid controller component). The pre-processor 206 can include at least one data cleaning component 208 or at least one data filtering component 210. The data processing system 202 can include at least one data repository 220. The data processing system 202 can include hardware or a combination of hardware and software, such as communications buses, circuitry, processors, communications interfaces, among others.

The data processing system 202 can reside on a computing device of the utility grid 100, or on a computing device or server external from, or remote from the utility grid 100. The data processing system 202 can reside or execute in a cloud computing environment or distributed computing environment. The data processing system 202 can reside on or execute on multiple local computing devices located throughout the utility grid 100. For example, the utility grid 100 can include multiple local computing devices each configured with one or more components or functionality of the data processing system 202.

Each of the components of the data processing system 202 can be implemented using hardware or a combination of software and hardware. Each component of the data processing system 202 can include logical circuitry (e.g., a central processing unit or CPU) that responses to and processes instructions fetched from a memory unit (e.g., memory 615 or storage device 625). Each component of the data processing system 202 can include or use a microprocessor or a multi-core processor. A multi-core processor can include two or more processing units on a single computing component. Each component of the data processing system 202 can be based on any of these processors, or any other processor capable of operating as described herein. Each processor can utilize instruction level parallelism, thread level parallelism, different levels of cache, etc. For example, the data processing system 202 can include at least one logic device such as a computing device or server having at least one processor to communicate via the network 140.

The components and elements of the data processing system 202 can be separate components, a single component, or part of the data processing system 202. For example, the interface 204, pre-processor 206, or input matrix generator 212 (and the other elements of the data processing system 202) can include combinations of hardware and software, such as one or more processors configured to ingest data, generate an input matrix, or execute a model, for example.

The components of the data processing system 202 can be connected or communicatively coupled to one another. The connection between the various components of the data processing system 202 can be wired or wireless, or any combination thereof. Counterpart systems or components can be hosted on other computing devices.

The network 140 can include computer networks such as the internet, local, wide, near field communication, metro or other area networks, as well as satellite networks or other computer networks such as voice or data mobile phone communications networks, and combinations thereof. The network 140 can include a point-to-point network, broadcast network, telecommunications network, asynchronous transfer mode network, synchronous optical network, or a synchronous digital hierarchy network, for example. The network 140 can include at least one wireless link such as an infrared channel or satellite band. The topology of the network 140 can include a bus, star, or ring network topology. The network 140 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The data processing system 202 can include, or have access to, a data repository 220. The data repository 220 can include or be managed by a database. The data repository 220 can include any type of data storage, memory, file server, hard drive, or cloud storage. The data repository 220 can store data in one or more data structures or data files. The data repository 220 can include, store, or manage utility grid data 222, models 224, commands 226, filters 228, optimization techniques 232, or configurations 234, in addition to other information, rules, programs, or data that facilitate one or more component or function of the system 200.

Utility grid data 222 can include one or more signals, values, or other information received from, or associated with, the utility grid 100 depicted in FIG. 1. The data processing system 202 can receive some or all the utility grid data from devices location on the utility grid 100, or other data sources or servers associated with the utility grid 100 or data processing system 202.

The utility grid data 222 can include various types of signals. The types of signals can correspond to different locations on the utility grid 100. For example, a first type of signal can correspond to location generic signals, a second type of signal can correspond to a substation location (e.g., substation 104) on the utility grid 100, a third type of signal can correspond to a primary circuit (e.g., primary distribution circuit 112) on the utility grid 100, and a fourth type of signal can correspond to a secondary circuit (e.g., secondary utilization circuits 116 or consumer sites 119a-n) on the utility grid 100.

Signals from the substation 104 (which can be referred to as substation signals) can include or correspond to signals received from devices located at the substation 104 or associated with the substation 104. Substation devices can include, for example, a voltage regulator (e.g., regulator interface 110 or voltage regulating transformer 106a), a load tap changer (e.g., 106b), a substation meter, a digital relay, or a circuit breaker. Signals from a voltage regulator or load tap changer can include a tap position, voltage setpoint, operating mode, or dwell time. Signals from a substation meter can include real power (single- or three-phase), reactive power (single- or three-phase), voltage (single phase), or power factor (single- or three-phase). Signals from a digital relay can include current (phase, phase-to-phase, positive sequence, negative sequence and zero sequence), voltage (phase, phase-to-phase, positive sequence, negative sequence and zero sequence), or frequency. Signals from a circuit breaker located at the substation 104 can include status or trip settings.

The data processing system 202 can receive signals from devices located at, or associated with, the primary circuit 112. Devices located on the primary circuit 112 can include, for example, a primary circuit meter, capacitor bank, voltage regulator, line voltage monitor, solar inverter, digital relay, circuit breaker, recloser, switch, or fuse. Signals received from a primary circuit meter can include real power (single- or three-phase), reactive power (single- or three-phase), voltage (phase- or phase-to-phase), or power factor (single- or three-phase). Signals received from a capacitor bank located at the primary circuit 112 can include bank state, setpoint, operating mode, dwell time, reactive power (single- or three-phase), or voltage ((phase- or phase-to-phase). Signals received from a voltage regulator located on the primary circuit 112 can include tap position, setpoint, operating mode, dwell time, source-side voltage (phase- or phase-to-phase), or load-side voltage (phase- or phase-to-phase). Signals received from a line voltage monitor located on the primary circuit 112 can include voltage (single phase), current (phase- or phase-to-phase), real power (single- or three-phase), or reactive power (single- or three-phase). Signals received from a solar inverter located on the primary circuit 112 can include inverter status, operating mode, current, voltage, real and reactive power. Signals received from a digital relay located at the primary circuit 112 can include current (phase, phase-to-phase, positive sequence, negative sequence and zero sequence), voltage (phase, phase-to-phase, positive sequence, negative sequence and zero sequence), or frequency. Signals received from a circuit breaker, recloser, switch, or fuse located at the primary circuit 112 can include status signals or trip settings.

The data processing system 202 can receive, and store in the utility grid data 222, signals from devices located at the secondary circuit 116. Devices located at the secondary circuit 116 can include, for example, a solar inverter, electric vehicle charging point, electric vehicle inverter, residential electric meter, or other devices located at consumer sites 119a-n. Signals received from solar or electric inverters, or electric vehicle charging points can include operating mode, setpoint, real power (single- or three-phase), reactive power (single- or three-phase), or voltage (phase- or phase-to-phase). Signals received from residential electric meters can include, for example, real power (single- or three-phase), reactive power (single- or three-phase), voltage phase- or phase-to-phase), current (single- or three-phase), power factor (single- or three-phase), current angle (single- or three-phase), phase-to-phase voltage angle (three-phase only), frequency, or temperature.

The data processing system 202 can receive, and the utility grid data 222 can include, signals or data from sources external to the utility grid 100. External sources can include, for example, a server 230 or database associated with a server 230 that is remote from the data processing system 202 and the utility grid 100. External sources can provide information that is generic in the sense that it may not come from a specific device on the utility grid 100 or be measured by a specific device on the utility grid 100. Generic information can refer to general information associated with a geographic area, temporal information, or other types of information. Generic or general signals can include, for example, time-of-day, day-of-week, day-of-year, current weather, forecasted weather, current and forecasted cost of electricity generation (e.g., resource rate of transmission), current and forecasted cost of energy delivery (e.g., resource rate of energy delivery), current and forecasted transmission, price signals, or distribution capacity.

The data repository 220 can include, store or manage one or more models 224. The model 224 can refer to or include a machine learning model. The model 224 can include a voltage power flow model generated, constructed or trained by a machine learning model generator 214. The model 224 can include a statistical representation of a utility grid 100 process that is generated based on utility grid data 222.

The data repository 220 can include or store commands 226. Commands 226 data structure can include control commands to control devices on the utility grid 100, alerts, notifications, reports, instructions, or other actions that can be performed by the data processing system 202 responsive to, or based on, utility grid data 222. Examples of commands 226 can include a command to increase or decrease a tap setting of a voltage regulating transformer 106a on the primary circuit 112, or change a setpoint on the primary circuit 112 or secondary circuit 116. Additional actions or determinations can include determining a topology of a utility grid 100 (e.g., main branches, secondary branches, customer sites, or other connections or couplings of the utility grid 100).

The data repository 220 can include filters 228. A filter 228 can refer to or include a signal processing filter, such as a low pass filter, bandpass filter, or high pass filter. A filter 228 can include a filter to smooth utility grid data or signals, such as a smoothness filter. A smoothness filter can create an approximating function that attempts to capture patterns or trends in the data, while leaving out noise or other fine-scale structures or instantaneous spikes or dips. The data processing system 202, using a smoothness filter, can modify data points of a signal so individual points can be reduced, and points that are lower than the adjacent points are increased, leading got a smoother signal. Examples of smoothness filters or techniques can include a linear smoother (e.g., where smoothed values are provided as a linear transformation of the observed values), additive smoothing, Butterworth filter, Chebyshev filter, digital filter, elliptic filter, exponential smoothing, Kalman filter, or moving average.

The data repository 220 can include optimization techniques 232. The optimization techniques 232 can be referred to or include a brute-force optimization technique, simulated annealing optimization technique, particle swarm optimization technique, genetic optimization technique, convex optimization technique, linear optimization technique, a nonlinear optimization technique, among others. The optimization techniques 232 can be used by one or more components of the data processing system 202 or the server 230 for power flow optimization. For example, an optimization technique 232 can be used by a model 224 and applied to bounds and constraints of the input variables and output variables. By applying the optimization technique 232, the model 224 can determine an adjustment to achieve an optimal state of the utility grid 100 based on the relationship between the bounds and constraints and the performance objective. The performance objective can include at least one of a level of substation demand, reduction in energy usage below a threshold (e.g., a first threshold), maintenance of stability during intermittent renewable generation, adjustment of a power factor range set by the utility grid, or increased capacity of distributed energy resources above a threshold (e.g., a second threshold).

The data repository 220 can store or include configurations 234 storage. The configurations 234 can include bounds or constraints of input variables and output variables of the data processing system 202. The terms bounds and constraints can be used interchangeably to indicate, for example, a boundary, a constraint, a criterion, a range, or a rule for the inputs and outputs. The configurations 234 can include a performance objective. The constraints or the performance objective can be received from an operator via the interface 204. For example, the operator can indicate the constraints for the inputs and outputs to abide by. These constraints can be used by the data processing system 202 to determine whether to provide an adjustment to a component within the utility grid. For example, an adjustment within the constraints of the output variables can be provided to the component and an adjustment outside the constraints can be reevaluated and tuned. The performance objective can be used by the data processing system 202 to determine whether to provide additional adjustment to the component. For example, subsequent to adjusting the component, the data processing system 202 can monitor the impact of the adjustment on the utility grid or the component of the utility grid (e.g., via new data samples) and compare it to the performance objective. If the performance objective is satisfied, the adjustment can be maintained. Otherwise, the data processing system 202 can configure the adjustment to achieve the performance objective within the constraints.

The data processing system 202 can include an interface 204 designed, constructed and operational to identify or receive utility grid data or signals. The interface 204 can include any type of communication interface, including a wired or wireless interface, network interface, or communication ports. The utility grid data or signals can be digitally recorded by a respective device on the utility grid 100, and transmitted to the data processing system 202 for processing. The data processing system 202 can receive the utility grid data as a real-time feed or stream. Real-time can refer to receiving signals from the utility grid 100 responsive to the devices on the utility grid 100 measuring or detecting values for the signal, as opposed to receiving the signals in a batch upload that occurs periodically or based on a time interval (e.g., every 6 hours, 12 hours, 24 hours, 48 hours or some other time period). Receiving the signals in real-time can refer to receiving the signals within 30 minutes of a device measuring or detecting the signals, 15 minutes, 10 minutes, 5 minutes, 1 minute, 30 seconds, 10 seconds, 5 seconds or less.

The data processing system 202 can receive a real-time feed or stream of signals. The signals can be sampled at a sampling rate. Signals can be sampled at a same rate, or different rates. Different types of signals can be sampled at different rates. Signals from different devices, although a same type of signal, may be sampled at different rate due to different device configurations or capabilities. The interface 204 can receive one or more data samples including signals from the utility grid 100. The interface 204 can receive the signals at one or more sampling rates and store the signals in the utility grid data structure 222 for further processing by the data processing system 202. The signals within the utility grid data structure 222 can be grouped into a data sample for processing by the data processing system 202. The received signals can be detected by devices located throughout the utility grid 100.

The interface 204 can pull signals, or receive signals pushed to the data processing system 202. For example, the interface 204 can poll or ping devices on the utility grid 100 for signals or data. The interface 204 can generate a request for utility grid data or signals, transmit the request, and receive the data responsive to the request. The interface 204 can generate a request for utility grid data, and transmit the request to a server 230 via network 140. For example, the data processing system 202, via interface 204, can transmit a request to server 230 for the time or date, current weather, forecasted weather, cost of electricity, or cost of energy delivery.

The interface 204 can receive inputs from remote devices via the network 140. The interface 204 can receive constraints for input variables and output variables and performance objectives for power flow optimization. For example, the interface 204 can receive inputs from an operator including bounds for input variables, constraints for output variables, and the performance objective. The interface 204 can distribute this input to one or more components within the data processing system 202, such as storing the constraints and performance objective within a configuration 234 data structure. The interface 204 can retrieve and provide the constraints to the circuit optimizer or the machine learning model to apply an optimization technique. After processing the data and determining an adjustment, the interface 204 can receive input signals to transmit to a component of the utility grid 100. Accordingly, the interface 204 can transmit the input signals to the component to satisfy a performance objective. The interface 204 can receive feedback data (e.g., new data samples) from components of the utility grid 100 via the network 140. The interface 204 can store or distribute new data samples throughout the components of the data processing system 202 for subsequent instructions.

The data processing system 202 can include a pre-processor 206 designed, constructed, or operational to clean, filter, or otherwise manipulate or process the received utility grid data or signals. The pre-processor 206 can clean, filter, or otherwise manipulate or process the received utility grid data or signals prior to the input matrix generator 212 using the received utility grid data to generate an input matrix for input into the machine learning model generator 214 or the machine learning model. In some cases, the device on the utility grid 100 can apply one or more pre-processing techniques prior to transmitting the data or signals to the data processing system 202. Local pre-preprocessing by a device on the utility grid 100 using one or more techniques or functions of the pre-processor 206 can reduce network bandwidth consumption or facilitate higher prediction accuracy by the data processing system 202.

The pre-processor 206 can analyze the received the utility grid data or signals to determine a sampling resolution. The pre-processor 206 can determine the sampling resolution for each type of signal, each type of signal from a specific device, or each signal from a specific device located on the utility grid 100. A type of signal can have the same sample rate across different devices or different sampling rates among different devices. A type of device can sample signals at the same rate as other devices of the same type, or devices of the same type may sample signals at different rates. A single device can sample all signals for which the device is configured to sample at the same rate, or the same device can sample different signals at different rates. Thus, the signals received by the data processing system 202 can have varying sampling rates. The sampling rates can, for example, be greater than or equal to 1 sample every 120 seconds, 1 sample every 90 seconds, 1 sample every 60 seconds, 1 sample every 45 seconds, 1 sample every 30 seconds or faster. Having a high sampling rate can facilitate the data processing system 202 adequately capturing the physical transfer function of the utility grid circuit. In some cases, the sampling resolution may not be homogenous between inputs. In this case, the pre-processor 206 can synchronize the inputs in time.

The data processing system 202 (e.g., via pre-processor 206) can determine that a sampling rate for a first signal of the first plurality of signals is different from a sampling rate for a second signal of the first plurality of signals. The data processing system 202 can synchronize the first signal with the second signal. The data processing system 202 can clean the first plurality of signals to remove time periods corrupted by noise or comprising null values.

For example, the data cleaning component 208 can synchronize the signals. Signals may be sampled at different rates such that samples have different timestamps. The data processing system 202 can identify a time period, and then synchronize the signal such that each signal has a sample for the timestamp. For example, the data processing system 202 can establish a sample rate that is common to the received signals. The common sample rate may be the lowest sample rate of the received signals, such as 1 sample every 60 seconds. The data processing system 202 can then use the 1 sample every 60 seconds sample rate as the sample rate to synchronize the received signals. The data processing system 202 can synchronize the signals by identify one sample for each signal for each 60 second time period. The data processing system 202 can identify the sample based on an average (or other statistic) of samples in the time period, the first sample in the time period (e.g., if a signal is sampled once every 30 seconds).

The data cleaning component 208 can synchronize signals by correlating timestamps among signals to identify a time period to which the samples corresponds. For example, two signals may be sampled at the same sample rate (e.g., once every 60 seconds), but they may be offset by approximately 5 seconds. The data processing system 202 can determine to synchronize two samples by determining that the offset between the two samples is less than the sample period of the signal. The data processing system 202 can determine to associate the two samples of the two different signals with a first time period if the different is less than or equal to half the sample period of the signal, and associate a sample of the first signal with a subsequent signal if the offset is greater than half the sample period, for example. Thus, the data processing system 202 can use one or more data synchronization techniques.

The signals received by the data processing system 202 may include invalid samples, missing samples, outliers, corrupted samples, or other erroneous data. The pre-processor 206 can include a data cleaning component 208 designed, constructed and operational to clean the received data and synchronize the signals. The data cleaning component 208 can clean the data in order to facilitate the production of accurate prediction results with the machine learning model. The data cleaning component 208 can use one or more techniques to clean the data. The data cleaning component 208 can detect errors and anomalies in the data, and correct the anomaly or remove the sample from the data set. The data cleaning component 208 can be configured with one or more rules, policies, logic, or heuristic techniques to detect errors or anomalies in the data, and resolve such errors. For example, the data cleaning component 208 can clean the data by removing time periods of data from variables or signals which were corrupted by noise, have been influenced by something that is an outlier from the nominal behavior (unless this outlier is of interest to predict), or have null values due to communications loss or failed recording.

To clean the data, the data cleaning component 208 can compare sample values of a signal with a threshold, nominal value, or statistical metric to determine whether the sample value is an outlier or erroneous. For example, if the sample value is a null value, then the data processing system 202 can determine the sample value is erroneous and remove the sample value. If the sample value is less than or equal to a predetermined threshold, then the data processing system 202 can determine the sample value is erroneous and remove the sample value. If the sample value is greater than or equal to a predetermined threshold, then the data processing system 202 can determine the sample value is erroneous and remove the sample value. The predetermined thresholds can be established or set by an administrator of the data processing system 202 in a configuration file stored in data repository 220. The threshold can be dynamically determined, for example based on an average, moving average, or other statistical metric associated with previous samples of the same signal.

Upon detecting that one or more samples of at least one signal from the received utility grid data set is invalid, corrupted by noise or includes null values (e.g., due to communication loss or failed recording), the data processing system 202 can clean the signal. The data processing system 202 can clean the signal by removing the sample from the data set. The data processing system 202 can further identify samples of other signals at the same timestamp, and remove those samples as well, thereby maintaining synchronicity of the utility grid data. For example, data processing system 202 can determine that a sample of a first signal at a timestamp is invalid or erroneous. The data processing system 202 can then identify all samples from all signals having the same timestamp, and then remove those samples from the data set. Time periods of data that were removed from one variable or signal can be removed from all variables (both input and output).

The data processing system 202 can identify the amount of missing data from cleaning the signals. The data processing system 202 can provide an estimated data in place of the missing data. For example, the data processing system 202 can determine whether the amount of data removed from cleaning the signals exceed a threshold (e.g., 20% of total received signals removed). If the amount exceeds the threshold, the data processing system 202 can estimate the missing data via time-based interpolation or other interpolation methods to determine the missing values. Further, upon removal of time periods of data from one variable, the data processing system 202 can remove time periods of data from all variables, e.g., both from the input and output.

The data processing system 202 (e.g., via data filtering component 210) can filter signals or the utility grid data. The data processing system 202, or pre-processor 206, can include a data filter component 210 designed, constructed, or operational to filter signals. Filtering the signals can increase the accuracy of the machine learning model generated by the machine learning model generator 214. The data filter component 210 can select a filter from the filter 228 data structure in data repository 220. The data filter component 210 can select a filter based on a characteristic of the signal being filtered, or the data set being filter. The data filtering component 210 can apply a filter to reduce noise in the data set. The data filter component 210 can apply a filter to smooth the data set or signals by removing noise, but without removing a trend in the signal. The data filter component 210 can apply filters 228 such as a low pass filter, bandpass filter, or high pass filter. The data filter component 210 can apply filters 228 to smooth utility grid data or signals, such as a smoothness filter. A smoothness filter can create an approximating function that attempts to capture patterns or trends in the data, while leaving out noise or other fine-scale structures or instantaneous spikes or dips. The data processing system 202, using a smoothness filter, can modify data points of a signal so individual points can be reduced, and points that are lower than the adjacent points are increased, leading got a smoother signal. Examples of smoothness filters or techniques can include a linear smoother (e.g., where smoothed values are provided as a linear transformation of the observed values), additive smoothing, Butterworth filter, Chebyshev filter, digital filter, elliptic filter, exponential smoothing, Kalman filter, or moving average (e.g., replacing each data point with the average of the neighboring data points defined with a span).

Thus, the data processing system 202 can apply a low-pass filter to the signals or the utility grid data, and apply a smoothness filter selected based on the sampling rate of the data and the desired smoothness of the output signals. The data processing system 202 can select the smoothness filter such that the underlying trends are preserved while discarding stochastic noise. For example, the data processing system 202 can select a filter configured to apply equal weights over the input samples. In another example, the data processing system 202 can select a filter configured with a user-specified weighting that applies different weights to each sample based on a desired emphasis of the input data. The length in time of the filter can be selected based on the timescale of the underlying characteristics that are being targeted, e.g., a short filter for transient signals and a long filter for more steady-state characteristics. For example, if the sample rate is fast, then the data processing system 202 can select a smoothness filter that can leverage the additional data samples to determine a trend and smooth the data. However, if the sample rate is low, then the data processing system 202 can select a smoothness filter that is more sensitive to the low data rate and lack of sufficient data, thereby preventing the smoothness filter from inadvertently altering the signal trend.

The pre-processor 206 can determine or generate statistical metrics based on the received signals or utility grid data. The pre-processor 206 can determine one or more statistical metrics based on signals from the substation 104, the primary circuit 112, the secondary circuit 116, or the generic signals not from the utility grid 100. The pre-processor 206 can generate, determine or otherwise identify statistical metrics that include, for example, a mean, median, minimum, maximum, standard deviation, mean difference, median difference, minimum difference, maximum difference, and standard deviation in difference. The pre-processor 206 can generate the statistical metric over a time period that indicates a physical manifestation of the utility grid system behavior or an exogenous behavior. The pre-processor 206 can provide these statistics as new inputs to the input matrix generator 212 to cause the input matrix generator 212 use these statistical metrics simultaneously with the utility grid signals received from devices on the utility grid 100.

The pre-processor 206 can store the pre-processed signals in utility grid data structure 222 for further processing by the data processing system 202. The pre-processor 206 can provide the pre-processed signals to the input matrix generator 212 for further processing. For example, the pre-processor 206, upon synchronizing, cleaning and filtering the received signals or utility grid data, can provide the data to the input matrix generator 212.

The data processing system 202 can include an input matrix generator 212 designed, constructed and operational to generate an input matrix. The input matrix generator 212 can receive utility grid data or signals from the pre-processor 206. In some cases, the input matrix generator 212 can receive the utility grid data or signals directly from the interface 204, or devices on the utility grid 100. For example, the devices on the utility grid 100 can be capable of performing local pre-processing, including one or more functionality of pre-processor 206, in which case the data processing system 202 may not perform further pre-processing via the pre-processor 206.

The input matrix generator 212 can generate a matrix have two or more dimension. The input matrix generator 212 can generate a two-dimensional ("2D") matrix in which a first dimension corresponds to timestamps, and a second dimension corresponds to signals (or variables or values). For example, in a 2D matrix or array, the rows can correspond to timestamps, and the columns can correspond to signals, as illustrated in Table 1.

TABLE 1

Illustrative Example of a 2D Input Matrix

| Timestamps\Signals | Current Weather | Substation Voltage Regulator Tap Position | Primary Circuit Meter Voltage | Secondary Circuit Electric Charge Point Operating Mode | Moving Average of Voltage over 3 samples |
|---|---|---|---|---|---|
| $t_0$ | 75° F. | 3 | 800 V | Off | n/a |
| $t_0 + 0.1$ | 75° F. | 3 | 799 V | On | n/a |
| $t_0 + 0.2$ | 75° F. | 3 | 798 V | On | 799 V |
| $t_0 + 0.3$ | 75° F. | 3 | 798 V | On | 798.3 V |
| $t_0 + 0.4$ | 75° F. | 4 | 797 V | On | 797.7 V |
| $t_0 + 0.5$ | 75° F. | 4 | 796 V | On | 797 V |

As illustrated in the example Table 1, the input matrix generator 212 can generate an input matrix with two or more dimensions. A first dimension can be rows that includes timestamps. The first timestamps can be in a format such as <date>.<hr>.<min>.<sec>. The first timestamp, represented as to in this example, can be in this format. The second and subsequent timestamps can also be in this format, or any other format. The example input matrix in Table 1 includes signals Current Weather, Substation Voltage regulator tap position, primary circuit meter voltage, secondary circuit electric charge point operating mode, and moving average of voltage over three samples. In this example, input signals can include Current Weather, Substation Voltage regulator tap position, secondary circuit electric charge point operating mode. The output signal can include primary circuit meter voltage and moving average of voltage over three samples. In some cases, the input signal can also include primary circuit meter voltage and moving average of voltage over three samples. The values for the signals can be temperature, tap position, voltage, or state or mode information (e.g., charging on or off, active or inactive, or standby mode).

The input matrix generator 212 can generate the input matrix using the synchronized, cleaned, and filtered signals received from the utility grid 100, as well as statistical metrics generated based on the received signals. The statistical metrics can be generated using the synchronized, cleaned and filtered signals. The rows of the matrix can be timestamps at which the data were recorded, and the columns of the matrix can be distinct variables or signals as well as the statistical inputs determined from the measured inputs. The length of time covered by the rows of the matrix can encompass any relevant behavior which the machine learning model should be able to predict.

The input matrix can include a historical input matrix. A historical input matrix can refer to or include signals that may not be real-time signals in that the signals were received previously. For example, the historical input matrix can include signals from a previous 24 hour period, 48 hour period, 72 hour period, a week, 2 weeks, 30 days, or some other time period prior to the current time period. The historical input matrix can be provided by an administrator of the data processing system 202, or stored in data repository 220. The input matrix generator 212 can apply one or more weights to a dimension of the historical input matrix to adjust an impact values of the dimension have on the machine learning model.

The input matrix generator 212 can weigh values in a dimension to increase or decrease the impact the values have when the machine learning model generator 214 forms the model. For example, the input matrix generator 212 can weigh timestamps (e.g., rows) within a time period in order to increase or decrease the importance of the signals for the timestamp when forming the model. The input matrix can be separated into input and output variables (columns), which can be used as the inputs to the machine learning technique used to generate the machine learning model configured to output a prediction of the chosen output variables. The prediction output by the machine learning model can include an output matrix which can include values associated with components of the utility grid 100. For example, the machine learning model can select a value to adjust the amount of voltage or power generated by a source of the utility grid 100, or increase or decrease a voltage range supplied to residential areas. The input matrix generator 212 can determine how to weight the rows based on an analysis of the signals, or based on input from an administrator of the data processing system 202. The weights can be assigned based on events identified in the signals, or events determined by other sources associated with the utility grid 100. The weights can be assigned based on rules or logic used to parse or process the input matrix to identify conditions or events that reflect higher or lower importance. For example, weights can be increased around a tap setting change event (e.g., the tap setting change from 3 to 4 at $t_o+0.4$ in Table 1. A tap setting change can be a behavior of the system that is the result of characteristics of electricity distribution via the utility grid 100. The weights can be increased around an operating mode change at an electric vehicle charging point (e.g., not charging to charging).

For example, the input matrix can be weighted such that certain timestamps or signals are treated with increased or decreased importance by the machine learning model generator 214. Weights can be automatically or manually applied. For example, the input matrix generator 212 can automatically weight values in the input matrix using a policy, such as based on detecting a condition or event in the input matrix. Weighting can refer to modifying values based on a factor, or function (e.g., double weight by multiplying each value by 2; or using a threshold to modify the value to a predetermined based on whether the input value is less than or equal to, or greater than the threshold).

To create the input matrix, the input matrix generator 212 can obtain the received signals, chronologically order them based on timestamps associated with each of the signals, and place the values in one dimension, and the timestamps in another dimension. The input matrix generator 212 can generate one or more matrices. For example, the input matrix generator 212 can generate a different matrix for each relevant time period (e.g., a predetermined time period such as 1 minute, 5 minutes, 10 minutes, 30 minutes, 60 minutes, or some other time period). The input matrix generator 212 can generate separate matrices based on behaviors identified in the data, such as tap setting changes, operating mode of a charging point, or other conditions or events. For example, a first input matrix may not include any signals indicating a change in a tap settings, whereas a second input matrix may include signals preceding the tap setting change, and subsequent to the tap setting change.

The input matrix generator 212 can perform one or more validation checks or error checks prior to providing the input matrix to the machine learning model generator 214. For example, the input matrix generator 212 can confirm that the dimensions of the input matrix satisfy a predetermined number of minimum dimensions. The input matrix generator 212 can confirm that the number of timestamps or signals satisfy a minimum threshold for the number of timestamps (or time period) or number of signals. For example, the minimum threshold for time period may be 1 minute, 2 minutes, 3 minutes, 4 minutes, 5 minutes, 10 minutes, 15 minutes, 30 minutes, 1 hour or some other time period that is representative or indicative of behavior of the utility grid 100. The minimum number of signals can include, for example, at least one signal from each location of the utility grid 100 (e.g., substation, primary circuit, and secondary circuit), or a minimum number of types of signals from each location on the utility grid 100 (e.g., real power, voltage, current, or tap position).

In the event the input matrix generator 212 determines that the generated input matrix does not include the minimum number of dimensions, timestamps, or values, the input matrix generator 212 can block or prevent the input matrix from being input to the machine learning model generator 214. Blocking input of the input matrix into the machine learning model generator 214 can prevent the invalid, incomplete, or failing input matrix from skewing or corrupting the model being trained or generated by the machine learning model generator 214. In some cases, however, the input matrix generator 212 can pass the incomplete input matrix to the machine learning model generator 214 to cause the machine learning model generator 214 to complete the input matrix by predicting the missing values (e.g., if the input matrix contains sufficient data that the machine learning model generator 214 can predict, with sufficient confidence, the missing values).

The data processing system 202 can include a machine learning model generator 214. The machine learning model generator 214 can be designed, constructed and operational to generate a machine learning model. The machine learning model generator 214 can use one or more machine learning techniques, functions, or processes to generate or train a model. For example, the machine learning model generator 214 can be configured with machine learning techniques including linear discriminant analysis (e.g., a technique configured to identify a linear combination of features that characterizes or separates two or more classes objects or events in order to express a dependent variable, such as an output signal, as a linear combination of other features or measurement signals in the input matrix), naive Bayes (e.g., a probabilistic classifier that can make classifications using a posterior decision rules with features and classes to determine the probability of the features, such as in the input matrix, occurring in each class, such as output signals, and return the most likely class), regression tree (e.g., using a decision tree as a predictive model where the target variable can take continuous values of an input matrix and go from observations about the input matrix to conclusions about the target value or output signal, such as an output signal), random forest (e.g., constructing multiple decision trees or regression trees at training time and outputting a mean prediction of the individual trees), k-nearest neighbor (e.g., a non-parametric process for classification or regression where the input matrix includes the k number of closets training examples in a feature space, and the output can be a class membership or a value of an output signal based on an average of the values of k nearest neighbors), support vector machine (e.g., a supervised learning model that analyzes input matrix data used for classification and regression analysis configured to build a model that assigns new examples, such as new input matrix, to one category or the other, making it a non-probabilistic binary linear classifier in which the model represents examples as points in space that are mapped so that the examples of the separate categories are divided by a gap to allow new examples, such as input matrix, to be mapped on the same space and predicted to belong to a category based on which side of the gap they fall), extreme learning machine (e.g., a feedforward neural network for classification or regression that include one or more layers of hidden nodes, where the parameters of the hidden nodes need not be tuned, and is based on an empirical risk minimization function whose learning process can be performed in a single iteration that avoids multiple iterations and local minimization), or a neural network (e.g., a collection of connected units or nodes that process input signals based on a non-linear function of the sum of the inputs, and provide output signals to another node in another layer, where the connections between nodes are edges that can have a weight that adjusts as the learning proceeds).

The machine learning model generator 214 can receive, as input, the input matrix generated by the input matrix generator 212. The machine learning model generator 214 can generate a machine learning model using one or more machine learning techniques, and store the model in the model data structure 224 in data repository, or otherwise manage or maintain the model. The use of different machine learning techniques to generate the machine learning models can reflect in different selections of optimization techniques for applying on one or configurations to optimize the control decision. For example, the machine learning model can be based on a linear model. The optimization technique applied to the configurations can include a linear optimization technique. The machine learning model generator 214 can be configured to generate and train the initial model based on initial training data sets that may be weighted. The machine learning model generator 214 can use a historical input matrix (e.g., generated from historical signals and historical statistical metrics determined from the historical signals) to train the machine learning model. Once trained, the model can be used to predict new outputs using a new input matrix.

Thus, the data processing system 202 can input the input matrix into a machine learning model constructed to output a value for a signal of the utility grid 100 based on the input matrix. The output value can be for a future time period. For example, a future time period can refer to a timestamp that is not included in the input matrix (e.g., in Table 1, the future timestamp can be $t_o+5$). Thus, the data processing system 202 can predict a value for one or more signals in the future. In some cases, the data processing system 202 can delegate the machine learning model tasks to a server 230, such as transmitting the input matrix to the server 230 to output a value for a signal of the utility grid 100.

The machine learning model generator 214 can generate multiple models, for example, including a virtual power flow ("VPF") model or an optimization model (e.g., optimization power flow module ("OPF") model). In some cases, the machine learning model generator 214 can provide at least one model to the circuit optimizer 216. For example, the machine learning model generator 214 can generate and provide the OPF model to the circuit optimizer 216, where the output of the VPF model can be provided to the OPF model to determine changes to the utility grid 100. In some cases, the OPF model can be a part of the circuit optimizer 216, such as including the features and functionalities of the OPF model. For example, the machine learning model generator 214 can generate the VPF model to provide a simulation of the circuit, and the circuit optimizer 216 can determine one or more input signals to achieve an optimal power flow based on the simulation (e.g., via different combinations of inputs and outputs).

The machine learning model generator 214 can account for the influence of the mathematical formulation (e.g., machine learning technique) used to generate a VPF model which can influence the resulting class of optimization problem. For example, the machine learning model generator 214 can generate a convex VPF model, thereby leading to a convex optimization model. Conversely, the machine learning model generator 214 can generate a non-convex VPF model, which can lead to an optimization model that may not produce a global optimum, such as in a timely manner. Hence, the VPF model can balance the complexity of the VPF model with the complexity of the resulting OPF model.

The machine learning model generator 214 can balance the complexity of the VPF model and the OPF model by accounting for factors, such as VPF model training time, prediction accuracy, generalizability, and quantity of training data. At least one of the factors can influence at least one other factor. For example, increasing the quantity of training data can include the training time and the prediction accuracy, and decreasing the training data can subsequently decrease training time and may decrease prediction accuracy. However, the time, computing resources, and quantity of training data may be infeasible for training the machine learning model. Further, a certain quantity of training data may not increase or may decrease the prediction accuracy while increasing the training time. Therefore, for example, the machine learning model generator 214 can account for the aforementioned factors and use a suitable amount of training data to reach an optimal control decision. The machine learning model generator 214 can generate a linear VPF model which can result in a linear programming ("LP") formulation of the OPF problem. The LPs can be solved in polynomial time to determine or predict a globally optimal solution to reach an optimal power flow.

The machine learning model generator 214 can train the machine learning model with data samples received from at least one automated metering infrastructure or autonomous device of the utility grid 100. The automated metering infrastructure can receive commands from the data processing system 202. The autonomous device can automatically adjust itself (e.g., self-adjusted settings), such as change a tap setting, power output level, among others, based on measurements from at least the automated metering infrastructure. The autonomous device can work in pair with the automated metering infrastructure, for example, changes to the automated metering infrastructure can affect the autonomous device setting. The data samples can include signals corresponding to voltage, active power, and reactive power detected by automated metering infrastructure, a tap position of a voltage regulator, a switch state of a capacitor bank, and weather data associated with locations on the utility grid 100, among other signals and information. In some cases, the machine learning model can include a three-phase unbalanced power flow model. In this case, the machine learning model can predict an adjustment value without a physical network model of the utility grid 100 or without a physics-based model. For example, the machine learning model generator 214 can generate a model to predict an adjustment value to reach a performance objective. The machine learning model generator 214 can input one or more data samples from the automated metering infrastructure. The model can use the data samples to predict an active power and reactive power at a substation and voltage values at various locations on the utility grid 100. Based on the trained model, the input data samples, and via applying optimization technique to the bounds and constraints of the input variables and output variables, the trained model can determine the adjustment to a component based on the predicted active power and the predicted reactive power at the substation and the predicted voltage values at the locations on the utility grid 100. In some cases, the data processing system 202 can use the machine learning model to predict an adjustment to utility grid devices without the physical model of the physical network of the utility grid 100.

In another example, the data processing system 202 can predict values for a time period in the input matrix, but for a signal that does not have a value in the input matrix. For example, the input matrix may be incomplete or missing a value for a signal at one or more timestamps. The input matrix may be missing the signal due to the signal value being corrupted or invalid at that timestamp and removed by the pre-processor 206. The pre-processor 206 can remove the signal value at the timestamp due to failing an error check or validation process, but the model machine learning model generator 214 can predict the value using valid signal samples that occur prior to, or subsequent to, the removed signal sample. Thus, the data processing system 202 can feed the input matrix into the machine learning model trained to predict the corresponding output matrix. This allows the data processing system 202 to predict outputs when data is temporarily unavailable, or allows the data processing system 202 to predict changes in the output that would occur. Thus, the data processing system 202 can predict, based on the input matrix and via the machine learning model, a value for the signal of the utility grid 100 at a time period for which the value is not provided in the input matrix (either a future value or a current value that is missing from the input matrix). The value not provided in the input matrix can include predicted input signals for the grid devices at a later time period.

The data processing system 202 can input the input matrix to the machine learning model to predict an output matrix. The output matrix can include values for signals of the utility grid 100. These signal values may not be provided in the input matrix used to train the machine learning model. The machine learning model can receive constraints on the input variables and output variables and an optimization technique to apply to constraints. The optimization technique can be selected by the circuit optimizer 216 based on the machine learning technique used to train the machine learning model.

The machine learning model can apply the optimization technique to the constraints, for example, to establish a linear relationship between input signals and an output variable or behavior of the utility grid 100. The constraints of the input variables can include a group or range of values of the input matrix used to train the machine learning model. The constraints of the output variables can include a group or range of values of the output matrix predicted by the machine learning model trained using the input matrix. In some cases, the machine learning model can filter out values from the input matrix or the output matrix based on the applied constraints. The input variable and the output variable can be in separate categories, such as using the circuit meter voltage as the input signal and monitoring the moving average of voltage as the output variable or behavior of the utility grid 100. The machine learning model can provide the output matrix or at least one input signal to the circuit optimizer 216 for selection, thereby, reaching an optimal control decision within the bounds of the input variables and output variables.

The machine learning model can provide predicted input signals to the circuit optimizer 216 which can be passed to the grid controller 218. After controlling a component of the utility grid 100, the machine learning model can receive feedback data from the component or other components of the utility grid 100 via the interface 204. The components can include controllable grid devices and autonomous grid devices (e.g., autonomous devices or devices not controllable by the utility grid 100). The autonomous grid devices can configure settings of connected devices upon detection of changes within the utility grid 100 or environment, such as weather forecast. The machine learning model can use the feedback data (e.g., after pre-processed) as new data samples or a new input matrix. The machine learning model can be retrained and subsequently provide an output matrix or input signals, within the bounds and constraints, to the circuit optimizer 216. The machine learning model can repeat this process with new data from the utility grid 100 to reach an optimal control decision and achieve the performance objective.

The data processing system 202 can predict changes to output based on adjusting input signals. The data processing system 202 can adjust input signals to control the behavior of the utility grid 100 or optimize the performance or functionality of the utility grid 100. The data processing system 202 can include a circuit optimizer 216 designed, constructed, and operational to identify changes to signals or values to realize an optimal or desired performance of the utility grid 100. The circuit optimizer 216 can use the machine learning model generated by the machine learning model generator 214 to predict behavior of the utility grid 100 based on adjusting input signals. The circuit optimizer 216 can adjust input signals to generate a simulated input matrix (e.g., via the input matrix generator 212). The circuit optimizer 216 can input the simulated input matrix into the machine learning model to predict or determine output values.

The circuit optimizer 216 can be configured with one or more rules, policies, or logical expressions to optimize a parameter or behavior of the utility grid 100 in order to improve the efficiency or reliability of power distribution and delivery. For example, the circuit optimizer 216 can be configured to facilitate Volt/VAR optimization and voltage management; system-state prediction, optimization and controls under various distributed energy resource scenarios (e.g., photovoltaic power generation, wind power generation, or electric vehicle penetration); fault, location, isolation, and system restoration; anti-islanding detection; or verification of the sequence and control of automatic switching, voltage control, and protection system operations.

The circuit optimizer 216 can receive bounds on input variables, constraints on output variables, and a performance objective to optimize the parameter or behavior of the utility grid 100 in order to achieve the performance objective. By utilizing the machine learning model (e.g., VPF model), the circuit optimizer 216 can be provided with the basis for reaching optimal control settings and adjustments given the constraints and objective of the utility grid 100. For example, the circuit optimizer 216 can provide the bounds and constraints to the machine learning model. The circuit optimizer 216 can select an optimization technique from the optimization techniques 232 data structure, for example, based on the machine learning technique used to generate the machine learning model. The circuit optimizer 216 can provide the optimization technique to the machine learning model. The machine learning model can apply the optimization technique to the bounds and constraints. Applying the optimization technique to the bounds and constraints can linearize the relationship between the input and output, such as to reach an objective goal. Based on the machine learning model and the optimized bounds and constraints, the circuit optimizer 216 can determine or predict an adjustment to at least one component of the utility grid 100 (e.g., via the linearly relationship) to achieve or satisfy the performance objective.

The circuit optimizer 216 can be configured to perform Volt/VAR optimization ("VVO") and voltage management. VVO can refer to a process of optimally managing voltage levels and reactive power to achieve more efficient gird operation by reducing system losses, peak demand or energy consumption or a combination of the three. During the process, the data processing system 202 (e.g., via grid controller 218) can control voltage control devices at a substation 104 and on the utility grid 100 circuit to reduce the voltage drop from the substation 104 to the end of the line (e.g., primary circuit 112 or secondary circuit 116) and reduce the service voltage to customers sites 119*a-n* while maintaining the voltage within defined limits. The efficiency gains can be realized from a reduction in the system voltage, which can result in less energy being consumed by end-use equipment served by the utility grid 100. To determine the voltage level that can be set, the circuit optimizer 216 can generate a simulated input matrix with, for example, a change to a voltage or tap setting at the substation 104 to determine the impact the change to the voltage or tap setting has on signals at other locations in the utility grid 100. The circuit optimizer 216 can also account for general signals, such as time of day, weather, or transmission resources. Using the machine learning model, the circuit optimizer 216 can determine whether the predicted output for a signal falls within a desired range. For example, the circuit optimizer 216 can continually lower the voltage at the substation 104 by adjusting the tap setting to determine whether desired voltages at other locations in the utility grid 100 meet a minimum desired voltage (e.g., 120V at the customer site 119*a*), taking into account other signals such as time of day, predicted consumption for the time of day, etc. Thus, the circuit optimizer 216, using the model, can determine a signal at the substation that facilitates VVO, and provide the value to the grid controller 218 to generate one or more commands to instruct one or more devices on the utility grid 100 to realize the predicted value to facilitate VVO.

Figure 4:
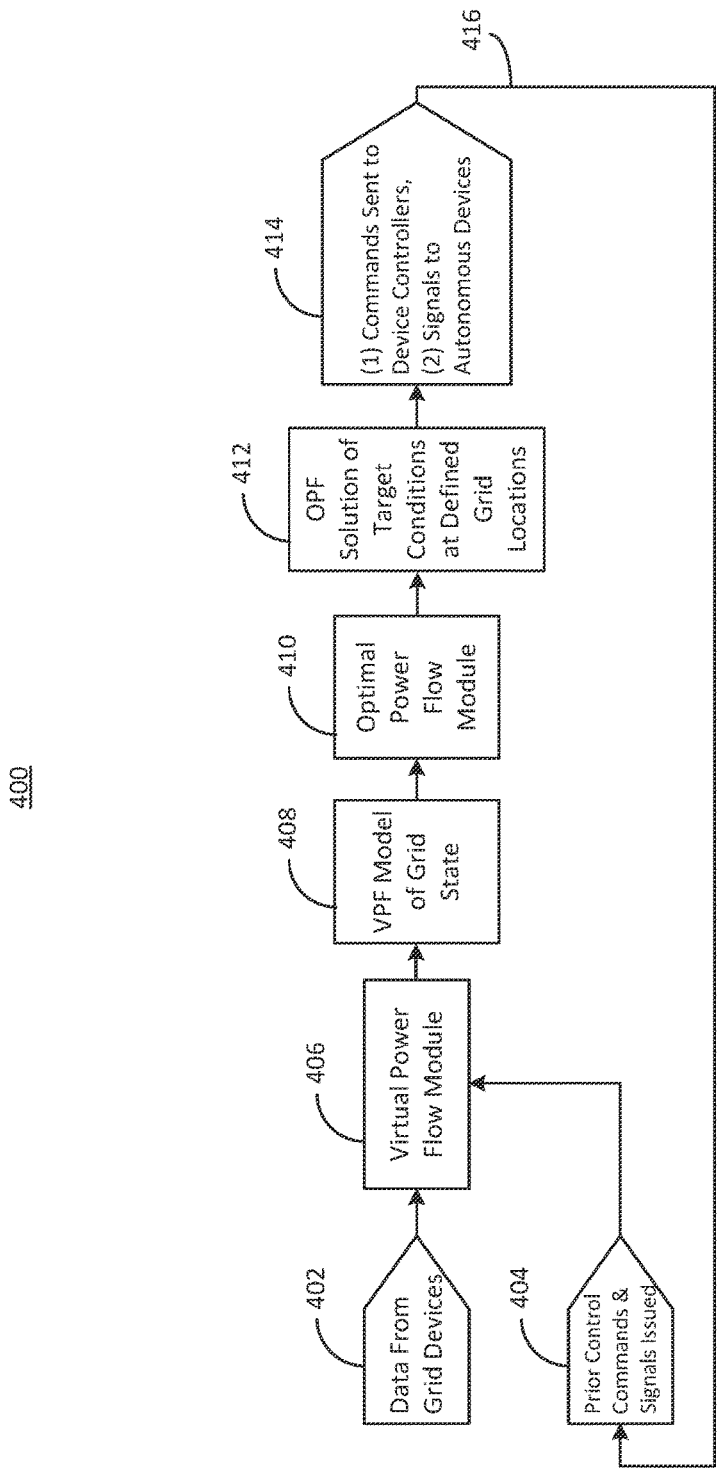
FIG. 4 is a flow diagram depicting an example operation for circuit optimization leveraging VPF or optimal power flow ("OPF") model, in accordance with an implementation.

The circuit optimizer 216 can predict the state of the system under various distributed energy resource scenarios, (e.g., photovoltaic power generation, wind power generation, or electric vehicle penetration). To do so, the circuit optimizer 216 can adjust an input signal that indicates a resource scenario (e.g., photovoltaic power generation indicated by a solar inverter device located on the primary circuit and a signal indicating power generated by the solar inverter on the primary circuit. By changing the value for the signal, the circuit optimizer 216 can determine how it impacts voltage levels, for example, at other locations on the utility grid 100. Adjusting the input signal can refer to the circuit optimizer 216 adjusting one or more components of the utility grid 100. Further, the circuit optimizer 216 can increase the signal indicating power generated by the solar inverter device, while adjusting a signal indicating a tap setting at the substation, for example, to determine the impact on voltage levels at various locations in the utility grid 100. By doing so, the circuit optimizer 216 can determine that, during solar power generation, the voltage level can be reduced at the substation 104 to a predicted level, while maintaining desired voltage levels throughout the utility grid 100. The data processing system 202 can perform this optimization in real-time based on a real-time input matrix received via interface 204, or simulate the input matrix to predict what condition may allow for signal adjustment and control. The circuit optimizer 216 can use the machine learning model to optimize the voltage and VAR levels on a circuit for a goal (e.g., reduced energy usage, stability during intermittent renewable generation, etc.) as depicted in FIG. 4.

After adjusting the input signals, the circuit optimizer 216 can determine if the output signals or behavior of the utility grid 100 satisfy the performance objective. The output or indication of utility grid 100 behavior can be received by the data processing system 202 for evaluation. For example, the circuit optimizer 216 can provide instructions to the grid controller 218 to maintain the input signal settings if the performance objective is satisfied. Alternatively, the circuit optimizer 216 can further adjust the input signal if the performance objective is not satisfied. This process can be reiterated and the machine learning model can be retrained to output a value for adjusting the input signals to satisfy the performance objective given the constraints. Further, the circuit optimizer 216 can adjust the input signal settings responsive to changes in the constraints or performance objective, such as when the current behavior of the utility grid 100 is no longer within the constraints or achieve the performance objective.

In some cases, the circuit optimizer 216 can select multiple optimization techniques for the machine learning model and apply these techniques to obtain two or more control decisions. For example, the circuit optimizer 216 can select a first optimization technique and a second optimization technique. The machine learning model can apply the first optimization technique to the constraints to determine a first value within the output matrix. The machine learning model can apply the second optimization technique to the constraints to determine a second value from the output matrix. The circuit optimizer 216 can predict or execute a simulation of the utility grid 100 behavior using the first value and the second value from the output matrix. The circuit optimizer 216 can select an output value (e.g., input signals) to control a component based on the simulation. The circuit optimizer 216 can select the output value closer to the performance objective within the constraints.

The data processing system 202 can determine when faults may occur on the utility grid 100, such as due to excess power usage during peak energy consumption (e.g., brownouts due to increased air conditioning use, or increased electric vehicle charging). The data processing system 202 can detect that such a fault is imminent based on detecting a trend in the input matrix using the machine learning model, and pre-emptively adjust signals of the utility grid 100 by generating commands to devices on the utility grid 100.

The data processing system 202 can predict, using the model and simulated input matrices, how to restore the utility grid 100 subsequent to a fault. For example, the data processing system 202 can determine what value for a signal would effectively restore the utility grid 100 without resulting in another imminent fault, and cause the grid controller 218 to generate control signals to achieve the desired result. To do so, the data processing system 202 can simulate input matrices further out in time based on trends in the input matrix that results in the fault in the first instance. The simulated input matrices may prioritize avoidance of a fault during a restoration time period (e.g., 10 minutes, 15 minutes, 20 minutes, 30 minutes, 1 hour, etc.), as opposed to VVO, in order to restore the utility grid 100. Thus, during a restoration phase, the circuit optimizer 216 can disable or decrease the weight of signals for VVO goals, while increasing the weights for signals for fault avoidance.

The data processing system 202 can perform anti-islanding detection, which can refer to a condition in which a distributed generator (e.g., a gas power generator or solar inverter device on the utility grid 100) continues to power a location even though electrical grid power is no longer present. This can lead to safety hazards, as well as an imbalance between load and generation in the islanded circuit, potential resulting in abnormal frequencies and voltages. The data processing system 202, using the machine learning model and an input matrix, can detect when such islanding may occur based on predicting output values for signals such as frequency and voltage. The data processing system 202 can determine, based on a comparison between a frequency and a voltage with a threshold, or via a classification of the output matrix, whether to classify the predicted output variables or signals as an instance of islanding. For example, the data processing system 202, using the machine learning model, can include an output signal in the output matrix that corresponds to a classification of islanding (e.g., binary classification indicating whether islanding is present, or not present, or a likelihood that islanding is present, or a confidence score associated with the binary classification). The data processing system 202 can predict islanding based on predicted output signals, or an output matrix generated via the machine learning model can include an islanding classification signal or variable.

The data processing system 202 can use the machine learning model to verify behavior of the utility grid 100. For example, the data processing system 202 can predict output values based on simulated input matrixes. The data processing system 202 can generate a simulated input matrix, and then predicted an output matrix via the machine learning model and the simulated input matrix. The data processing system 202 can then receive a real-time signals to generate a real-time input matrix and determine whether the values in the input matrix match with the simulated or predicted values. Matching can be exact match, or match within a tolerance, such as predetermined percentage (e.g., 1%, 2%, 3%, 4%, 5% or some other percentage) or other range. If the real-time measured do not match the predicted signals, then the data processing system 202 can determine that the behavior of the utility grid 100 may be anomalous. The data processing system 202 can determine the anomalous behavior may be the result of a faulty device on the utility grid 100, or other fault, failure or attack on the utility grid 100.

Thus, the data processing system 202 can predict, via the input matrix and the machine learning model, changes to signals associated with components (or devices) of the utility grid 100. The data processing system 202 (e.g., via circuit optimizer 216) can evaluate the changes to identify a desired outcome for the utility grid 100. The data processing system 202 (e.g., via grid controller 218) can generate one or more commands to control one or more of the components to achieve the desired outcome for the utility grid 100. The data processing system 202 can compare the value for the signal of the utility grid 100 predicted by the circuit optimizer 216 via the machine learning model with a threshold, and generate the command to control the component on the utility grid 100 based on the comparison (e.g., adjust tap setting to increase or decrease voltage level).

The data processing system 202 can include a grid controller 218 designed, constructed and operational to generate commands to control a device or component on the utility grid 100. The grid controller 218 can receive an indication from the circuit optimizer 216 as to a desired change to a signal or value associated with a device or location on the utility grid 100. The grid controller 218 can access a commands data structure 226 stored in data repository 220 to determine a command to issue to one or more components or devices on the utility grid 100 that would result in the desired signal or value predicted by the circuit optimizer 216 via the machine learning model.

For example, the circuit optimizer 216 can predict that a tap position change would facilitate VVO. The grid controller 218 can receive, from the circuit optimizer 216, an indication of the desired tap position change and the device or component on the utility grid 100. The grid controller 218 can determine an address or identifier for the device. For example, the grid controller 218 can perform a lookup in commands data structure 226 or other data file to determine an internet protocol address of the device, or other address or unique identifier associated with the device.

The grid controller 218 can determine a protocol or format for commanding the device. For example, using the commands data structure 226, the grid controller 218 can perform a lookup using information about the type of device (e.g., obtained based on the device identifier or otherwise obtained from the circuit optimizer 216) to determine a format, protocol, or structure for the command. The grid controller 218 can use one or more rules, or logic statements to construct the command. The grid controller 218 can use a template to construct the command. The template can be retrieved from the data repository 220 (e.g., from commands data structure 226). The grid controller 218 can determine the desired change, and then populate the template to generate a command. The grid controller 218 can transmit the command to the device via interface 204 and network 140. Thus, the grid controller 218 can provide a command to control a component of the utility grid 100 responsive to the value for the signal of the utility grid 100 predicted by the machine learning model and via the circuit optimizer 216.

Subsequent to the grid controller 218 controlling the component on the utility grid 100 with the command, the data processing system 202 can receive additional signals in real-time. The data processing system 202 can evaluate or process the received input signals, which are a result of the command provided by the grid controller 218. The data processing system 202 (e.g., the machine learning model generator 214) can update or train the machine learning model based on the command and the received signals.

The grid controller 218 can generate and provide alerts, notifications, reports or other information to facilitate operation, management, or maintenance of the utility grid 100. For example, instead of, or in addition to, transmitting a control command to a device on the utility grid 100, the grid controller can generate an instruction, report, alert or other notification of a predicted output condition. An administrator of the utility grid 100 or data processing system 202 can receive the report (e.g., via network 140) and take an action to manage or maintain the utility grid 100. For example, the report or notification can indicate that a device on the utility grid 100 is nearing failure or has failed. The administrator of the utility grid 100, responsive to the notification, can replace or repair the device. In some cases, the grid controller 218 can automatically disable the failed or failing device using a control command. Types of control commands can include, for example, activating or deactivating a device, changing a parameter of the device, setting a parameter of the device, adjusting operation of the device, disabling or turning off a device, executing a diagnostic check on a device, or requesting information from the device.

The grid controller 218 can transmit signals to autonomous grid devices. The autonomous grid devices can be a part of the components of the utility grid 100. The autonomous grid devices may not be controlled by the utility grid 100 and can include devices such as photovoltaic power generator (e.g., "PV" or solar power system), electric vehicle, or smart thermostat. The signals can include commands from the commands 226 data structure and can include instructions for autonomous grid devices to feedback data to the data processing system 202. For example, the grid controller 218 can receive instructions from the circuit optimizer 216 to send input signals to an autonomous grid device. The grid controller 218 can transmit input signals to the autonomous grid device. After receiving the input signals, the data processing system 202 can receive historical data (e.g., voltage consumption, timestamps, generated power, etc.) from the autonomous grid device, where the historical data from the autonomous grid device can be used as new data samples to train the machine learning model. In other cases, the data processing system 202 can receive one or more values for one or more signals subsequent to the adjustment of the component of the utility grid 100. The grid controller 218 can determine a second adjustment to the component of the utility grid 100 based on the one or more values for the one or more signals received subsequent to the adjustment to the component, the machine learning model, and the optimization technique, for example. In some cases, the grid controller 218 can transmit a signal suggesting a setting to configure an autonomous device to improve the cost and efficiency of the autonomous device. In this case, if an operator of the autonomous device enabled a setting to receive suggestions, the configuration can be accepted or declined. Configurations of the autonomous device can be overridden by the operator of the device.

The grid controller 218 can adjust a value of a component of the utility grid 100 to satisfy the performance objective while within the constraints of one or more output variables. The output variables can refer to input signals to adjust the settings of the component. The component can include at least one of a voltage regulator, a capacitor bank, a switch, or an inverter. For example, the grid controller 218 can transmit a command to one of the components. The command can include instructions to the component to adjust a value for at least one of the output variables. The grid controller 218 can adjust the value within the constraints of the one or more output variables. By adjusting the value, the data processing system 202 can receive feedback information and confirm that the performance objective is satisfied.

Figure 3:
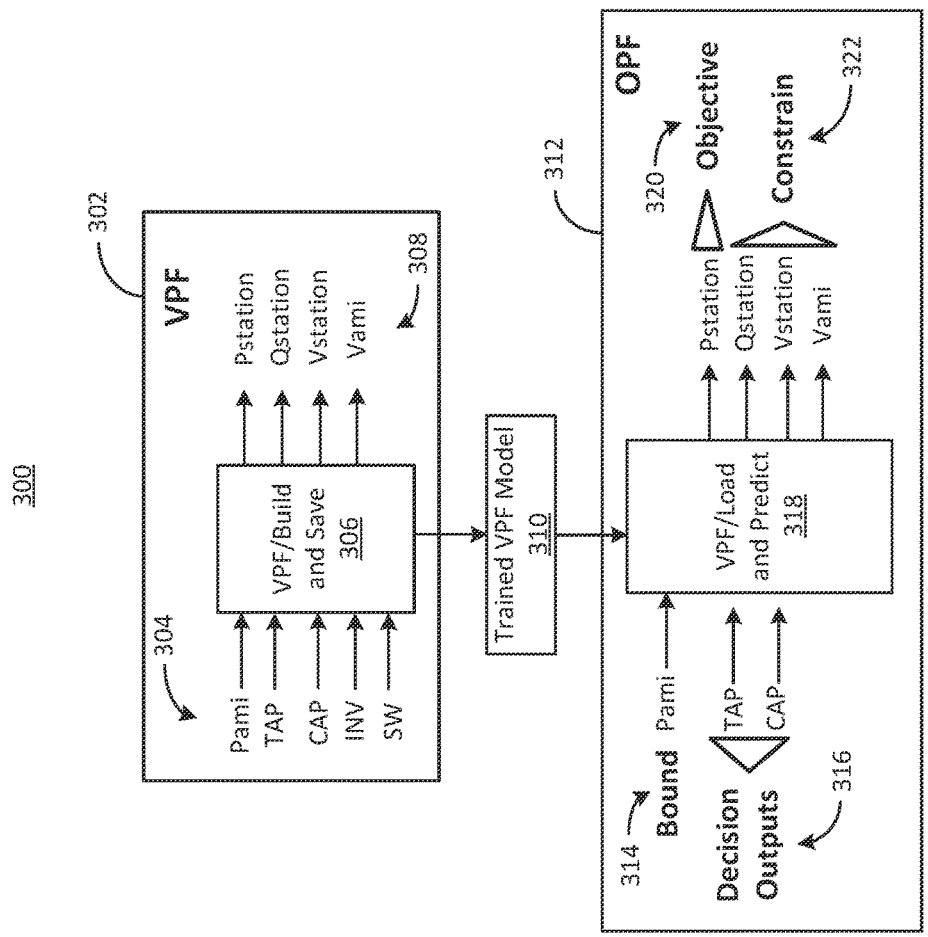
FIG. 3 is a block diagram illustrating an example system for inserting a machine-learned virtual power flow ("VPF") model into a circuit optimizer, in accordance with an implementation.

Referring now to FIG. 3, an example system 300 for inserting a machine-learned VPF model into a circuit optimizer, in accordance with an implementation, is shown. The components of system 300 can represent one or more components of system 200 in FIG. 2. For example, features and functionalities of system 300 can be performed by the data processing system including the machine learning model generator or the circuit optimizer. The system 300 can include a VPF module 302 (or VPF component), a trained VPF model 310 trained by the VPF module 302, and an OPF module 312 (or OPF component) for optimizing input variables and output variables of the trained VPF model 310. The VPF module 302 and OPF module 312 can include one or more element, component or functionality depicted in system 600. The VPF module 302 can perform or execute features and functionalities similar to the machine learning model generator of the data processing system. The trained model 310 can be trained or include features and functionalities similar to the trained machine learning model from the machine learning model generator. The OPF module 312 can perform or execute features and functionalities similar to a circuit optimizer of the data processing system (e.g., optimization model).

The VPF module 302 can train a machine learning model using input variables 304 to predict the output variables 308. For example, the VPF module 302 can receive data samples (e.g., training data, input signals, or input matrix) to train the VPF model 310. The data samples can include active power from automated metering infrastructure ("AMI") measurements ("Pami"), voltage regulator tap positions ("TAP"), capacitor bank data ("CAP"), inverter data ("INV"), and switch states ("SW") of components of the utility grid. The data samples can include timestamps associated with information from the AMI or the utility grid. In some cases, the data samples can include feedback data from the autonomous grid devices or other devices of the utility grid. For example, the data samples can include the receipt time of the Pami, TAP, CAP, INV, and SW of the components. Using the input variables 304, the VPF module 302 can build and save 306 the VPF model 310 to predict the output variables 308. The VPF module 302 can train the VPF model 310 based on a linear model, such as using a linear machine learning technique to account for a linear optimization technique (e.g., used by the OPF module 312).

Subsequent to building and saving 306 the VPF model 310, the VPF module 302 can predict the output variables 308 using the VPF model 310. The output matrix can include at least an active power at the substation ("Pstation"), a reactive power at the substation ("Qstation"), voltages at locations of the utility grid (e.g., voltage at the substation ("Vstation") or voltage at the AMI ("Vami")), or timestamps associated with the aforementioned variables. For example, the VPF module 302 can predict, using the input variables, a minimum, an average, a maximum, or mean power consumption at various locations within the utility grid during different times. The prediction can include power consumption for controllable grid devices and autonomous grid devices. The prediction can be constructed into an output matrix including values for signals of the utility grid not provided in the input matrix, for example.

After training, the VPF module 302 can substitute the trained VPF model 310 into the OPF module 312. For example, the VPF module 302 can include input variables or output variables outside the bounds and constraints. The bounds and constraints can be provided by an operator of the systems 200 or 300. Substituting the VPF model 310 into the OPF module 312 can refer to optimizing the input variables and output variables of the VPF model 310 to reach the performance objective given the bounds and constraints of the inputs and outputs.

The VPF module 302 can receive new data samples from components of the utility grid, including controllable grid devices and autonomous grid devices. For example, after substituting the trained VPF model 310 into the OPF module 312 to generate an optimization model, the OPF module 312 can transmit decision outputs 316 to a grid controller to adjust a setting of at least one component of the utility grid. After the adjustment, the VPF module 302 can receive new data samples (e.g., feedback data) from components of the utility grid. The VPF module 302 can retrain the VPF model 310 using the feedback data to achieve a performance objective.

The OPF module 312 can receive the trained VPF model 310 from the VPF module 302. The OPF module 312 can load and predict 318 input variables and output variables, respectively. For example, the OPF module 312 can load input signals, such as the active power from the AMI measurements. The OPF module 312 can predict output signals, such as active power at the substation, reactive power at the substation, voltages of the utility grid, and voltages of the AMI. These input and output signals can be bounded or constrained. The Pami can be bounded 314, and the Qstation, the Vstation, and the Vami can be constrained 322 to a pre-determined range. The bound 314 and constraint 322 can be configured by an operator or dynamically determined by the OPF module 312. The OPF module 312 can apply at least one optimization technique (e.g., linear optimization technique) to the bound 314 and constraint 322 to construct a linear relationship between the input variables and output variables of the VPF model 310.

For example, an operator of the utility grid can apply a bound 314 or a range of Pami measurements (e.g., 780V to 820V) used as input data for the trained VPF model 310. The OPF module 312 can change the values of the Pami based on the bound 314. The OPF module 312 can remove Pami values outside the bound 314. The Pami values can be fixed at a given time sample. The OPF module 312 can apply or optimize different TAP and CAP settings (e.g., decision outputs 316) to the VPF model 310 for the objective 320, such as minimizing Pstation while maintaining the Qstation, Vstation, and Vami variables within user-defined ranges or the constraint 322. Other objectives 320 can include at least reduction of energy usage, increase of stability during intermittent renewable generation, or increase of capacity of distributed energy resources. Based on the input variables and using the trained VPF model 310, the OPF module 312 can predict Pstation values, Qstation values, Vstation values, and Vami values. Each predicted variable can be associated with different constraint 322, such as different ranges, minimum, or maximum output. The Pstation value can be the objective 320 of the OPF module 312 and indicate power flow optimization.

The OPF module 312 can determine that at least one of the predicted variables falls outside the given constraint 322. For example, based on the TAP and CAP settings, the OPF module 312 can determine that at least one of the Qstation values, Vstation values, or Vami values is outside their respective constraint 322. The OPF module 312 can identify or remove the TAP or CAP setting associated with at least one of the predicted values outside the constraint 322 from the decision outputs 316. Based on the objective 320, such as minimizing Pstation value in this example, the OPF module 312 can select at least one combination of TAP and CAP settings to adjust a component of the utility grid. In some cases, the bound 314, decision outputs 316, objective 320, or constraint 322 can be applied to different input variables or output variables based on the power flow optimization objective.

The OPF module 312 (or the VPF module 302) can include other variables as input into the trained VPF model 310, such as weather information or forecast, utility grid maintenance information, among other information that can influence the objective 320. The OPF module 312 can store a list of decision outputs 316 within the bound 314 and constraint 322 in a data repository, such as the data repository of the data processing system in FIG. 2. For example, the OPF module 312 can transmit the decision outputs 316 to a grid controller. The grid controller can adjust components of the utility grid using at least one of the decision outputs 316. After receiving feedback information from the components of the utility grid, the OPF module 312 can provide additional adjustment to the components from the list of decision outputs 316, for example, if the initial adjustment did not satisfy the objective 320. If the initial adjustment satisfies the objective 320, the OPF module 312 can maintain the initial adjustment.

Referring now to FIG. 4, a flow diagram 400 depicting an example operation of a system for circuit optimization leveraging VPF or OPF model, in accordance with an implementation, is shown. The flow diagram 400 can represent operation of a system, such as utility grid 100 depicted in FIG. 1, the system 200 depicted in FIG. 2, the system 300 depicted in FIG. 3, or one or more components thereof. For example, aspects of the flow 400 can be performed by a data processing system, input matrix generator, circuit optimizer, machine learning model generator, grid controller, or utility grid. The flow 400 can embed the VPF module and the OPF module from FIG. 3 into a closed optimization loop. The flow 400 can include receiving data from grid devices at ACT 402 and prior control commands and signals issued at ACT 404. At ACT 406, the VPF module can receive data from the grid devices and prior control commands and signals issued. At ACT 408, the data processing system can generate a VPF model of grid state. At ACT 410, the OPF module can receive the VPF model. At ACT 412, the OPF module can provide at least one solution of target conditions at defined grid locations. At ACT 414, the data processing system can send commands to one or more device controllers and commands to autonomous devices. At ACT 416, issued commands and signals can be fed back into the VPF module. The optimization loop can be iterated via ACTs 402, 404, 406, 408, 410, 412, 414, and 416. Other flows can be used to provide optimization, such as linear flows.

Still referring to FIG. 4, and in further detail, at ACT 402, real-time data from grid devices can be ingested. Real-time data can refer to measurements made by devices on the utility grid, and transmitted to a data processing system. The data processing system can receive the real-time measurements via a network. The data processing system can receive the measurements based on a time interval or batch upload. The measurements can be in one or more formats, units, or types. Utility grid data can refer to, or include, timestamps and signals associated with various devices on the utility grid. The utility grid data can include an indication or identifier of the device from which the measurement is obtained. Utility grid data can include location information for the device.

At ACT 404, prior commands and signals issued to the autonomous devices can be input into the VPF module at ACT 406. If no prior commands or signals were issued or sent, then prior commands or signals may not be provided or received by the data processing system. Prior commands can refer to any prior commands, whether or not they were provided by the data processing system. Prior signals can refer to any prior signals sent to any autonomous device. Prior commands or signals, for example, may be provided by other control systems associated with the utility grid, or administrators thereof. Prior commands or signals may not be available if, for example, they are not associated with a current time period for which the utility grid data is provided. Prior commands or signals can be a part of feedback data to incorporate in training the machine learning model.

At ACT 408, the VPF module of grid state can receive data from grid devices at ACT 402 or prior control commands and signals issued at ACT 404. The VPF module can receive feedback data from components of the utility grid after the commands or signals are issued. The VPF module can perform features and functionalities similar to the VPF module in FIG. 3 or the machine learning model generator in FIG. 2. The VPF module can be a part of the data processing system. The data processing system can generate an input matrix using data from the grid devices and, if available, prior control commands and signals issued. The data processing system can feed the input matrix for the VPF module to train the VPF model of the grid state. The VPF model can be based on a linear model trained using at least a linear machine learning technique. The data processing system can substitute the VPF model into the OPF module at ACT 410.

At ACT 410, the OPF module can receive the trained VPF model from the VPF module. The OPF module can be configured to optimize the VPF model based on the bound of the input variables, the constraint of the output variables, and the performance objective. The OPF module can be a part of the data processing system. For example, the OPF module can apply an optimization technique (e.g., linear optimization technique) to the bound and constraint of the input and output. Hence, the OPF module can determine an optimal decision output via a linear relationship between the input and the output. The OPF module can change input variables outside the bound to predict output variables given a range of input variables. The OPF module can remove input variables, output variables, or other associated variables outside the bound and constraint from consideration to determine one or more decision outputs. The input variables can include at least Pami measurements, TAP, or CAP. The output variables can include at least Pstation, Qstation, Vstation, or Vami. For example, the OPF module can provide Pami measurements within the bound and a set of TAP and CAP settings into the trained VPF model. The VPF model can predict the output variables with the objective of minimizing Pstation, and constraint on the Qstation, Vstation, and Vami. The OPF module can remove one or more TAP and CAP settings resulting in the output variables outside the constraint. Therefore, in this example, the OPF module can provide a list or a subset of decision outputs to reach the objective.

At ACT 412, the OPF module can determine one or more decision outputs (e.g., predicted changes, which can be referred to as solution based on given conditions and state of the utility grid based on the utility grid data and prior control commands) to adjust one or more components of the utility grid to achieve the performance objective. The components can include at least a grid controllable device or an autonomous grid device (e.g., non-grid-controlled device). For example, using the VPF model (e.g., the machine learning model) the OPF module of the data processing system can evaluate the changes in grid conditions against the desired outcome. The OPF module can evaluate the change to determine whether to make further adjustments to facilitate the desired outcome, such as minimizing power consumption or VVO. In some cases, the bound and constraint can be adjusted. In this case, the OPF module can reevaluate the simulated input and output variables to determine changes to the grid devices.

The OPF module can select different settings for various locations within the grid based on the performance objective associated with the locations. For example, the utility grid can be separated into three zones, such as Zone A for minimizing active power consumption at the substation, Zone B for reducing energy usage, and Zone C for increasing stability during intermittent renewable generation. Given the bounds and constraints, the OPF module can provide a list of TAP and CAP settings/configurations. The OPF module can select a first set of configurations for Zone A, a second set of configurations for Zone B, and a third set of configurations for Zone C. The OPF module can transmit the configuration sets to, for example, a grid controller to control devices within the utility grid.

The process of the flow 400 can be iterated until an optimal set of changes is obtained, which are then sent to the grid devices at ACT 414. Once the optimal control is satisfied (e.g., based on VVO being achieved), the data processing system can send the commands to device controllers or devices on the utility grid. Further, the data processing system can send signals to autonomous devices. The devices on the grid can modify their operation based on the change. The autonomous device may not modify their operation, instead provide feedback data of at least power consumption, power generation, among others after the changes are implemented into the grid devices. The issued commands and signals can be fed back (e.g., via feedback ACT 416) into the VPF module, such that their effects on the grid are learned (e.g., via ACT 404). By sending signals to the autonomous devices, the data processing system can enable the participation of the autonomous devices in circuit optimization. The data processing system can evaluate the input over the output via feedback commands/signals and data samples from grid devices after adjustment to optimize predicted outputs.

One or more portions of the flow 400 can be performed by a centralized system, such as a data processing system. In some cases, one or more portions of the flow can be performed by local data processing systems. For example, one or more local devices on the utility grid can be configured with one or more components or functionality of the data processing system, and perform such functionality. The one or more local devices can include local machine learning models, and use the local machine learning model to predict a change or output. The local predictions can be provided to a centralized data processing system for further processing and control.

Figure 5:
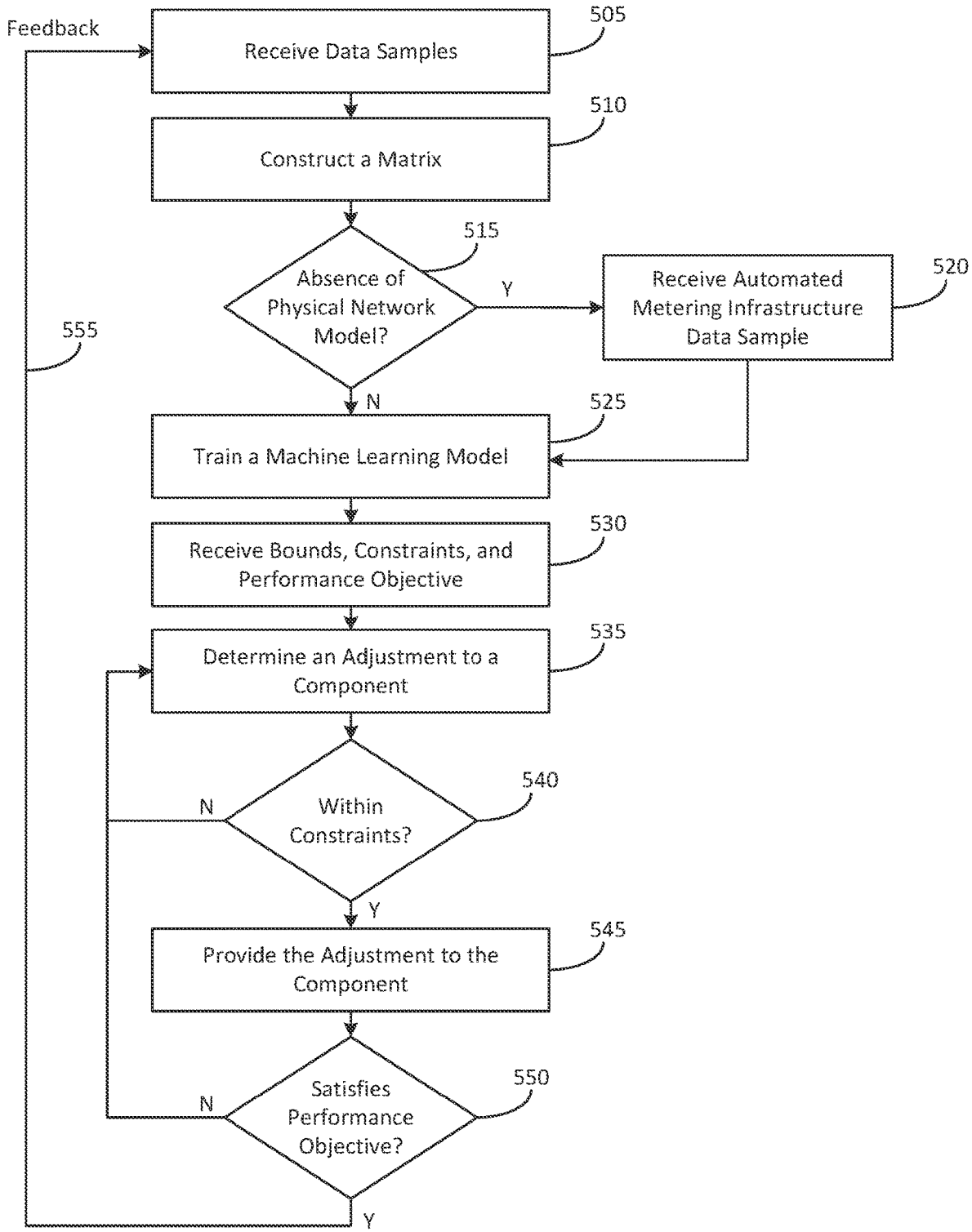
FIG. 5 is a flow diagram depicting an example of a method of controlling component in a utility grid, in accordance with an implementation.

FIG. 5 is a flow diagram depicting an example of a method of controlling one or more components in a utility grid, in accordance with an implementation. The method 500 can be performed by one or more systems or components depicted in FIGS. 1, 2, and 3, including, for example, a data processing system or a utility grid.

The method 500 can include identifying or receiving data samples at ACT 402. The data samples can include signals detected by one or more devices located at one or more portions of the utility grid. The signals can correspond to at least voltage, active power, and reactive power detected by automated metering infrastructure, a tap position of a voltage regulator, a switch state of a capacitor bank, and weather data associated with various locations on the utility grid. The one or more devices can include a grid controllable device or an autonomous device (e.g., non-controllable grid device). A data processing system can receive or identify signals via a real-time data feed or stream. Signals can refer to or include utility grid data, such as characteristics of electricity, device settings, device operation modes, or weather conditions. Signals can be obtained from various sources, such as from different devices at different locations on the utility grid, an external server, or other data sources.

The data processing system can determine whether there are any invalid samples. The data processing system can identify invalid samples based on comparing sampling values to thresholds, detecting noise, detecting corrupted samples, or detecting missing or null samples. The data processing system can determine whether signals received from various devices are in synchronicity with one another. If the data processing system detects invalid samples or out synch samples, the data processing system can proceed to clean the signals.

The data processing system can clean the signals using one or more data cleaning techniques. The data processing system can remove invalid samples. Removing invalid samples can include removing a sample from each signal corresponding to the timestamp having the invalid sample. However, in some cases, the data processing system can remove only the invalid sample, as opposed to the other valid samples for the same timestamp, in order to predict the value of the invalid sample using a machine learning model.

Upon cleaning the sample, the data processing system can determine whether to apply a filter. For example, the data processing system can proceed to determine whether to apply a filter if the data processing system determined that there were no invalid samples. The data processing system can apply a filter if the data processing system determines that the accuracy or reliability of a prediction can be improved by filtering the input data (e.g., based on detecting frequencies that are determined to have a negative impact, such as a low frequency, or detecting volatility or noise in the data).

If the data processing system determines to apply a filter, the data processing system can proceed to select and apply a filter. The data processing system can select a filter based on characteristics of the utility grid data, such as sample rate, trends, noise characteristics, or detected unwanted frequencies. For example, the data processing system can select a low pass filter and a smoothness filter to remove noise while maintaining desired trends in the data.

Upon applying the filter to the data, the data processing system can determine statistical metrics. If the data processing system determines not to apply a filter (e.g., the data quality is high and does not include unwanted noise or frequencies), the data processing system can proceed to determine statistical metrics such as mean, median, minimum, maximum, standard deviation, mean difference, median difference, etc. The data processing system can determine the statistical metrics for a period of time or a predetermined period of time or a predetermined number of samples. The data processing system can determine the number of samples or period of time-based on conditions or events associated with the data, such as faults, tap changes, voltages above or below a threshold, or other conditions.

At ACT 510, the data processing system can construct or generate an input matrix. The data processing system can generate the input matrix including the received input signals and the determined statistical metrics. The data processing system can generate the input matrix with the synchronized, cleaned, and filtered utility grid data. The data processing system can generate the input matrix with rows and columns corresponding to time stamps and signal values, respectively. The size of the input matrix can correspond to a number of samples or time period determined based on a predetermined value, or dynamically determined based on conditions or events associated with the utility grid data. The data processing system can weigh one or more rows (e.g., timestamps) in order to increase or decrease the importance of the signal values at the time stamp when generating or training the machine learning model.

At decision block 515, the data processing system can determine whether a physical network model of the utility grid is available. If the physical network model is not available, the data processing system can identify data samples from the automated metering infrastructure. Thereafter, the data processing system can proceed to ACT 525 to train a machine learning model using the data samples from the automated metering infrastructure of the utility grid. For example, the data processing system can retrieve data samples of the automated metering infrastructure from a data repository. In some cases, the data processing system can send a signal to the automated metering infrastructure to request data samples. After transmitting the signal, the data processing system can receive data samples reverted back from the automated metering infrastructure. If the physical network model is available, the data processing system can proceed to ACT 520 to train the machine learning model. In some cases, the data processing system can use data samples from the available physical network model of the utility grid and the automated metering infrastructure to train the machine learning model. The data processing system can provide the data samples from devices of the utility grid (e.g., used to generate input matrix) to train a machine learning model.

At ACT 525, the data processing system can input the generated input matrix into a machine learning model and predict an output value. The data processing system can use the input matrix or other matrix constructed prior to the input matrix to train the machine learning model. The data processing system can be configured to use one or more types of machine learning models, e.g., based on a linear model. The data processing system can use a linear machine learning technique to train the machine learning model, among other types of machine learning techniques. The data processing system can train a three-phase unbalanced power flow model as the machine learning model for predicting an optimal control decision. The data processing system can select a machine learning technique to train the machine learning model based on or accounting for an optimization technique. For example, the data processing system can select a linear machine learning technique to train the model and select a linear optimization technique to optimize the machine learning model. The data processing system can receive instructions from an operator to select a machine learning technique and an optimization technique, such as to enable the machine learning model to be readily available for the linear programming solvers. After training the model, the data processing system can proceed to ACT 530 where the data processing system can receive the bounds, constraints, and performance objective. The data processing system can use the machine learning model to predict, for example, active power at a substation, reactive power at a substation, or voltage values at various locations on the utility grid, among other values generated or consumed by grid devices.

At ACT 530, the data processing system can receive bounds for one or more input variables to the machine learning model, constraints on one or more output variables of the machine learning model, and a performance objective for the utility grid. The data processing system can receive the bounds, constraints, and performance objective from an operator (e.g., user-defined variables). The one or more input variables with the bound can include at least one variable of the input matrix. The one or more output variables with the constraints can include at least one variable of the output values or an output matrix predicted by the machine learning model. For example, the data processing system can generate an output matrix based on the input matrix. The output matrix can include values for a time period different from the time periods in the input matrix (e.g., a future output value). Other values of the output matrix can be different from the values in the input matrix, such as predicted input signals. The output matrix can also fill in the missing values in the input matrix, for example, determine values for a signal that is missing from the input matrix. The data processing system can constrain one or more values of the input matrix or the output matrix.

At ACT 535, the data processing system can determine an adjustment to a component of the utility grid, such as to satisfy the performance objective. The data processing system can determine the adjustment using the machine learning model, for example, to predict an output matrix based on an input matrix. The data processing system can determine the adjustment by using an optimization technique applied to the bounds for the one or more input variables and the constraints on the one or more output variables to determine a subset of adjustment values from the output matrix to reach the performance objective. The data processing system can determine possible input values to adjust the grid devices. For example, the data processing system can receive an input matrix including active power measurements, TAP, and CAP information from at least one component of the utility grid. If the bound is applied to the active power measurements, the data processing system can simulate different TAP or CAP settings to predict different output, such as active power, reactive power, or voltages output at various locations of the utility grid. The data processing system can proceed to decision block 540 to determine whether the input variables and output variables are within the bounds and constraints. In some cases, the input values can be changed or removed based on the bounds applied using the optimization technique. In further example, the data processing system can determine an adjustment based on output variables simulated or predicted by the machine learning model, such as the predicted active power at the substation, the predicted reactive power at the substation, or the predicted voltage values.

At decision block 540, the data processing system can determine whether the one or more input variables are within the bounds and the one or more output variables are within the constraints. If at least one of the input variables is outside the bounds, the data processing system can change the value of the input variable or remove the input variable from the prediction. The data processing system can process the input variables using the machine learning model. The data processing system can provide different sets of decision outputs with the input variables. For example, the input variable restricted by the bound can include active power measurement from grid devices. The data processing system can simulate various TAP and CAP settings to the machine learning model to predict output variables. The operator can provide one or more constraints at least one of the output variables, such as the reactive power and voltages generated or consumed by the grid devices.

For example, the data processing system can determine that an output variable is outside the constraint and proceed back to ACT 535 to adjust input settings to the machine learning model. Referring back to the previous example, the data processing system can remove TAP or CAP settings associated with output variables outside the constraints. If the input variables and the output variables are inside the bounds and constraints, the data processing system can proceed to ACT 545 to provide an adjustment to the component of the utility grid. In some cases, the data processing system can determine if the output variables (e.g., actual power generation or consumption) satisfy the constraints after adjusting a grid device. In this case, the data processing system can revert back to ACT 545 to select or determine a second adjustment, which when stimulated, provide output variables satisfying the constraints, to adjust one or more settings of the grid device.

The data processing system can determine, using the machine learning model, that the output does not satisfy the performance objective. For example, the performance objective can be to minimize active power consumption (e.g., within a pre-determined range). The data processing system can identify at least one input variable (e.g., potential adjustment or setting) that results in active power consumption outside the pre-determined range. Accordingly, the data processing system can remove the input variable from a list of input variables that can be provided to the grid devices. In some cases, the data processing system can maintain a list of input variables that do not achieve the performance objective, e.g., to retrieve for training the machine learning model.

At ACT 545, the data processing system can provide the adjustment to the component of the utility grid. The adjustment can refer to a command to the component that adjusts a value for at least one of the one or more output variables within the constraints on the one or more output variables. The adjustment can satisfy the performance objective, such as at least one of a level of substation demand, reduction in energy usage below a threshold (e.g., a pre-determined maximum energy usage), maintenance of stability during intermittent renewable generation, adjustment of a power factor range set by the utility grid, or increased capacity of distributed energy resources above a second threshold (e.g., beyond a pre-determined capacity limit). The data processing system can determine whether the optimize an aspect of operation or performance of the utility grid. The data processing system can determine to perform VVO, for example, or optimize some other aspect or characteristic of the utility grid. If the data processing system determines to optimize the utility grid. Once the data processing system determines to optimize at least a portion or location of the utility grid, the data processing system can send the adjustment to at least one device at the portion. The data processing system can proceed to decision block 550 to determine whether the adjustment satisfies the performance objective. The data processing system can provide the adjustment to controllable grid devices. The data processing system can send signals to autonomous devices. For example, the data processing system can send the signals to request feedback data from the autonomous device, such as power generation or consumption after adjusting the grid device. The data processing system can adjust a parameter or value of a signal (e.g., a voltage at a location on the utility grid, or setting of a device at a location of the utility grid). In some cases, the data processing system can provide the adjusted parameter and return to ACT 510 to generate a new input matrix. This input matrix can be referred to as a simulated input matrix because the data processing system adjusted a parameter prior to transmitting the parameter or a control command to a device to implement the adjusted the parameter. Thus, the data processing system can simulate how adjusting the parameter would impact the utility grid by re-performing at least ACTS 510 and 525 using an adjusted parameter from ACT 535. The data processing system can iterate through this loop one or more times.

At decision block 550, the data processing system can determine whether the adjustment satisfies the performance objective (e.g., performance has been optimized). If the adjustment satisfies the performance objective, the data processing system can maintain the adjustment and return to ACT 505. For example, the data processing system can determine that the desired performance threshold have been met by the adjusted parameter or the data processing system can determine that further adjustments are beginning to degrade the performance of the utility grid (e.g., tap change resulting in a voltage level at a location of the utility grid being below a minimum threshold).

The data processing system can determine that the performance objective was not satisfied. For example, the data processing system can receive feedback from at least the adjusted grid device indicating an output variable not satisfying an objective threshold. The objective threshold can include maximum power consumption, minimum, power generation, efficiency rating, among others. The data processing system can proceed back to ACT 535 to adjust the input variables to the grid device. In some cases, the data processing system can proceed to ACT 555 to receive feedback data. The data processing system can use the feedback data to generate a new input matrix for training or simulation purposes via the machine learning model.

The data processing system can receive previous adjustments or signals sent to the grid devices as new data samples. The previous adjustments or signals can be referred to as feedback data. The data processing system can use the feedback data to train the machine learning model, improving the accuracy of the simulated output variables. Further, the feedback data can include weather conditions, maintenance information, or other consumption/generation information from any grid devices.

The data processing system can provide a second adjustment to the grid devices. For example, the data processing system can determine that the output variables are outside the user-defined constraints or that a first adjustment did not satisfy the performance objective. Responsive to the determination, the data processing system can identify or determine a second adjustment variable to provide to at least one grid device (e.g., send a command to the component to adjust a value). The data processing system can repeat this iteration to determine optimal settings for the grid devices based on the performance objective given the bounds and constraints.

In some cases, the data processing system can determine not to optimize the utility grid, or not to further optimize because the adjusted parameter was determined to result in optimum performance. In this case, the data processing system can proceed to ACT 555 and return to ACT 505 to iterate the process of making control decisions. At ACT 555, the data processing system can transmit a control command, instruction, notification, report, or alert based on the output value from ACT 535. The data processing system can provide the control command and signals as feedback back to ACT 505, at which point the data processing system can received updated utility grid data, including real-time signals and other control commands, and continue predicting the behavior of the utility grid in order to evaluate or manage the utility grid, optimize performance of the utility grid.

Figure 6:
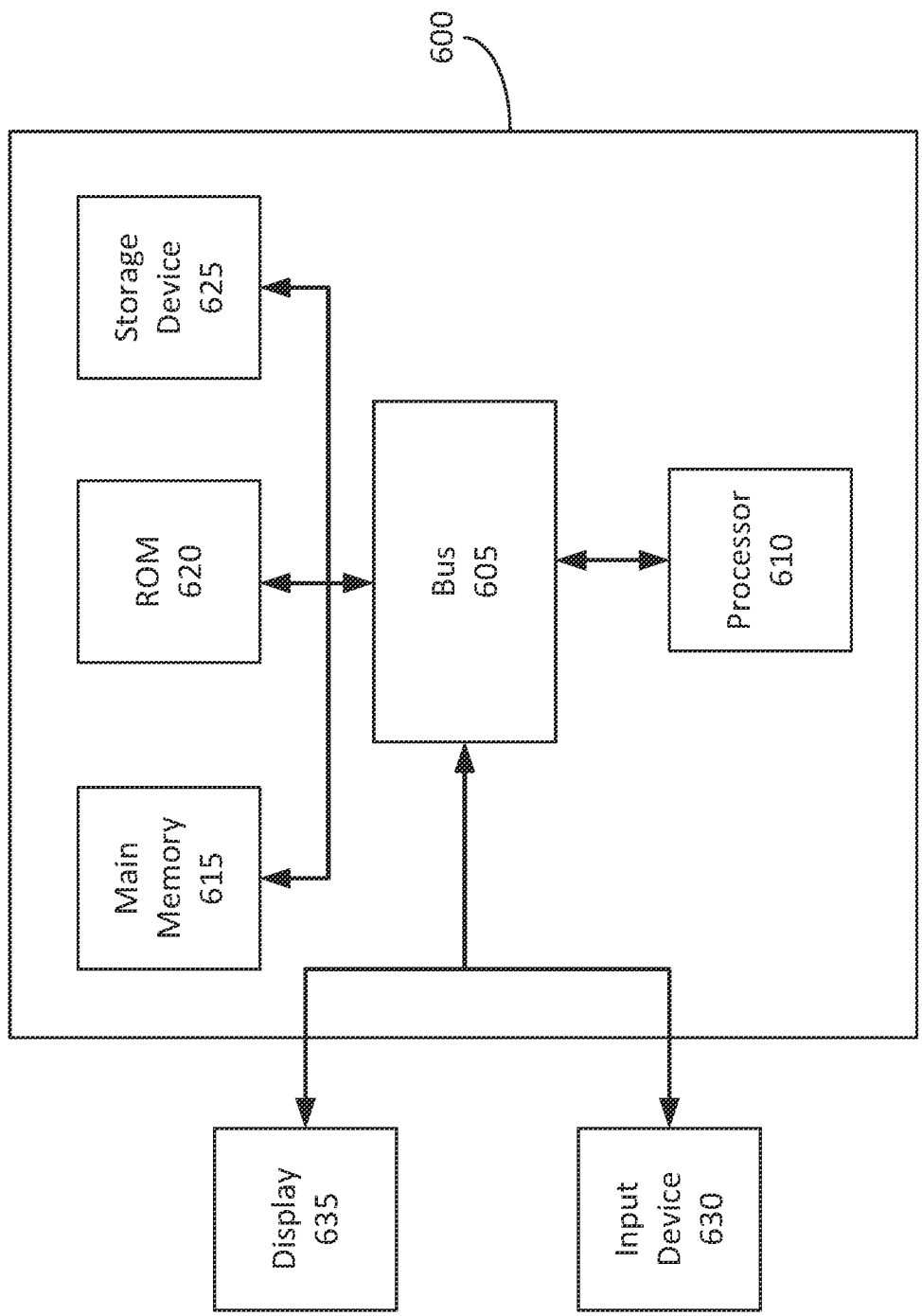
FIG. 6 is a block diagram illustrating an architecture for a computer system that can be employed to implement elements of the systems and methods described and illustrated herein, including, for example, aspects of the utility grid depicted in FIG. 1, the systems depicted in FIGS. 2-3, the operations depicted in FIG. 4, and the method depicted in FIG. 5.

FIG. 6 is a block diagram of an example computer system 600. The computer system or computing device 600 can include or be used to implement the data processing system 202, or its components such as the data processing system 202. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can also be used for storing position information, utility grid data, command instructions, device status information, environmental information within or external to the utility grid, information on characteristics of electricity, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as an administrator of the data processing system or the utility grid. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 202, or other component of FIG. 1.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the descriptions herein emphasize the structural independence of the aspects of the system components (e.g., arbitration component) and illustrate one grouping of operations and responsibilities of these system components. Other groupings that execute similar overall operations are understood to be within the scope of the present application. Modules can be implemented in hardware or as computer instructions on a non-transient computer-readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of controlling components of a utility grid, comprising:

receiving, by a data processing system, a plurality of data samples comprising signals detected by one or more devices located at one or more portions of a utility grid;

constructing, by the data processing system, a matrix having a first dimension corresponding to timestamps of the plurality of data samples, and a second dimension corresponding to the signals and one or more statistical metrics generated based on the signals;

training, by the data processing system, a machine learning model based on the matrix to configure the machine learning model to predict an output matrix comprising values for signals of the utility grid not provided in the matrix;

receiving, by the data processing system, bounds for one or more input variables to the machine learning model, constraints on one or more output variables of the machine learning model, and a performance objective for the utility grid;

determining, by the data processing system, based on the machine learning model and via an optimization technique applied to the bounds for the one or more input variables and the constraints on the one or more output variables, an adjustment to a component of the utility grid that satisfies the performance objective; and providing, by the data processing system, the adjustment to the component of the utility grid to cause the utility grid to satisfy the performance objective.

2. The method of claim 1, comprising:

training, by the data processing system absent a model of a physical network of the utility grid, the machine learning model with data samples received from automated metering infrastructure of the utility grid.

3. The method of claim 1, comprising:

training, by the data processing system, the machine learning model based on the matrix to configure the machine learning model to predict the output matrix comprising values for signals of the utility grid at a time for which the values for the signals are not provided in the matrix.

4. The method of claim 1, wherein the constraints on the one or more output variables comprise a predetermined range of voltages for a customer device connected to the utility grid, and the performance objective comprises at least one of a level of substation demand, reduction in energy usage below a threshold, maintenance of stability during intermittent renewable generation, adjustment of a power factor range set by the utility grid, or increased capacity of distributed energy resources above a second threshold.

5. The method of claim 1, comprising:

receiving, by the data processing system, the plurality of data samples comprising signals corresponding to voltage, active power, and reactive power detected by automated metering infrastructure, a tap position of a voltage regulator, a switch state of a capacitor bank, and weather data associated with a plurality of locations on the utility grid;

inputting, by the data processing system, the plurality of data samples into the machine learning model to predict an active power and reactive power at a substation and voltage values at a plurality of locations on the utility grid; and determining, by the data processing system, the adjustment to the component based on the predicted active power and the predicted reactive power at the substation and the predicted voltage values at the plurality of locations on the utility grid.

6. The method of claim 1, wherein the machine learning model comprises a three-phase unbalanced power flow model.

7. The method of claim 1, wherein the optimization technique comprises one of a brute-force optimization technique, simulated annealing optimization technique, particle swarm optimization technique, genetic optimization technique, convex optimization technique, linear optimization technique, or a non-linear optimization technique.

8. The method of claim 1, wherein the machine learning model is based on a linear model, and the optimization technique comprises a linear optimization technique.

9. The method of claim 1, wherein the component comprises at least one of a voltage regulator, capacitor bank, switch, or inverter, comprising:

transmitting, by the data processing system, a command to the component that adjusts a value for at least one of the one or more output variables within the constraints on the one or more output variables and satisfies the performance objective.

10. The method of claim 1, comprising:

receiving, by the data processing system from an autonomous device connected to the utility grid, one or more values for one or more signals subsequent to the adjustment of the component of the utility grid, the autonomous device not directly controlled by the data processing system; and determining, by the data processing system, a second adjustment to the component of the utility grid based on the one or more values for the one or more signals received subsequent to the adjustment to the component, the machine learning model, and the optimization technique.

11. A system to control components of a utility grid, comprising:

a data processing system comprising memory and one or more processors to:

receive a plurality of data samples comprising signals detected by one or more devices located at one or more portions of a utility grid;

construct a matrix having a first dimension corresponding to timestamps of the plurality of data samples, and a second dimension corresponding to the signals and one or more statistical metrics generated based on the signals;

train a machine learning model based on the matrix to configure the machine learning model to predict an output matrix comprising values for signals of the utility grid not provided in the matrix;

receive bounds for one or more input variables to the machine learning model, constraints on one or more output variables of the machine learning model, and a performance objective for the utility grid;

determine, based on the machine learning model and via an optimization technique applied to the bounds for the one or more input variables and the constraints on the one or more output variables, an adjustment to a component of the utility grid that satisfies the performance objective; and provide the adjustment to the component of the utility grid to cause the utility grid to satisfy the performance objective.

12. The system of claim 11, wherein the data processing system is further configured to:

train, absent a model of a physical network of the utility grid, the machine learning model with data samples received from automated metering infrastructure of the utility grid.

13. The system of claim 11, wherein the data processing system is further configured to:

train the machine learning model based on the matrix to configure the machine learning model to predict the output matrix comprising values for signals of the utility grid at a time for which the values for the signals are not provided in the matrix.

14. The system of claim 11, wherein the constraints on the one or more output variables comprise a predetermined range of voltages for a customer device connected to the utility grid, and the performance objective comprises at least one of a level of substation demand, reduction in energy usage below a threshold, maintenance of stability during intermittent renewable generation, adjustment of a power factor range set by the utility grid, or increased capacity of distributed energy resources above a second threshold.

15. The system of claim 11, wherein the data processing system is further configured to:

receive the plurality of data samples comprising signals corresponding to voltage, active power, and reactive power detected by automated metering infrastructure, a tap position of a voltage regulator, a switch state of a capacitor bank, and weather data associated with a plurality of locations on the utility grid;

input the plurality of data samples into the machine learning model to predict an active power and reactive power at a substation and voltage values at the plurality of locations on the utility grid; and determine the adjustment to the component based on the predicted active power and the predicted reactive power at the substation and the predicted voltage values at the plurality of locations on the utility grid.

16. The system of claim 11, wherein the machine learning model comprises a three-phase unbalanced power flow model.

17. The system of claim 11, wherein the optimization technique comprises one of a brute-force optimization technique, simulated annealing optimization technique, particle swarm optimization technique, genetic optimization technique, convex optimization technique, linear optimization technique, or a non-linear optimization technique.

18. The system of claim 11, wherein the machine learning model is based on a linear model, and the optimization technique comprises a linear optimization technique.

19. The system of claim 11, wherein the component comprises at least one of a voltage regulator, capacitor bank, switch, or inverter, and the data processing system is further configured to:

transmit a command to the component that adjusts a value for at least one of the one or more output variables within the constraints on the one or more output variables and satisfies the performance objective.

20. The system of claim 11, wherein the data processing system is further configured to:

receive, from an autonomous device connected to the utility grid, one or more values for one or more signals subsequent to the adjustment of the component of the utility grid, the autonomous device not directly controlled by the data processing system; and determine a second adjustment to the component of the utility grid based on the one or more values for the one or more signals received subsequent to the adjustment to the component, the machine learning model, and the optimization technique.

* * * * *